(12) United States Patent
Bhanage et al.

(10) Patent No.: US 11,122,594 B2
(45) Date of Patent: Sep. 14, 2021

(54) DISTRIBUTED OVERLAPPING BASIC SERVICE SET SCHEDULING TECHNIQUES FOR INCREASED SPECTRAL EFFICIENCY

(71) Applicant: Cisco Technology, Inc., San Jose, CA (US)

(72) Inventors: Gautam D. Bhanage, Milpitas, CA (US); Brian D. Hart, Sunnyvale, CA (US); David S. Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 59 days.

(21) Appl. No.: 16/512,251

(22) Filed: Jul. 15, 2019

(65) Prior Publication Data

US 2021/0022156 A1    Jan. 21, 2021

(51) Int. Cl.
| | |
|---|---|
| *H04W 72/12* | (2009.01) |
| *H04W 88/08* | (2009.01) |
| *H04W 80/08* | (2009.01) |
| *H04W 72/04* | (2009.01) |

(52) U.S. Cl.
CPC ... *H04W 72/1257* (2013.01); *H04W 72/0446* (2013.01); *H04W 80/08* (2013.01); *H04W 88/08* (2013.01)

(58) Field of Classification Search
CPC . H04W 72/1257; H04W 88/08; H04W 80/08; H04W 72/0446
See application file for complete search history.

(56) References Cited

U.S. PATENT DOCUMENTS

| | | | |
|---|---|---|---|
| 2015/0245360 A1* | 8/2015 | Gao | H04B 7/0452 370/329 |
| 2016/0278114 A1* | 9/2016 | Hevizi | H04W 72/1294 |
| 2019/0124672 A1 | 4/2019 | Kamalizad et al. | |
| 2020/0014576 A1* | 1/2020 | Cherian | H04L 1/0068 |
| 2020/0076552 A1* | 3/2020 | Cherian | H04W 72/0426 |

OTHER PUBLICATIONS

Huang et. al., "Scheduling and Resource Allocation in OFDMA Wireless Systems," Orthogonal Frequency Division Multiple Access Fundamentals and Applications, Feb. 2009, 39 pages.

(Continued)

*Primary Examiner* — Alex Skripnikov
*Assistant Examiner* — Sharmin Chowdhury
(74) *Attorney, Agent, or Firm* — Patterson + Sheridan, LLP

(57) ABSTRACT

Techniques for triggering multiple basic service sets (BSSs) to share resources for a coordinated transmission are described. One technique includes determining a first amount of data available to send in a first BSS and determining a second amount of data available to send in a second BSS. The first BSS and the second BSS form an overlapping BSS. An amount of resources in the first BSS that is available to share with the second BSS for a coordinated transmission from the first BSS and the second BSS is determined based on the first amount of data and the second amount of data. A frame that includes an indication of the amount of resources is generated and transmitted to at least one of the first BSS and the second BSS.

20 Claims, 15 Drawing Sheets

(56) References Cited

OTHER PUBLICATIONS

Kulkarni et al., "Efficient Orthogonal Frequency-Division Multiple Access Scheduling for Internet of Things Devices," IP.com Disclosure No. IPCOM000252736D | Publication Date: Feb. 5, 2018 Abstract Only.
Taneja et al., "Resource Allocation Networks," Technical Disclosure Commons, Jun. 22, 2018, 37 pages.
Mukesh Taneja,"Network Segmentation and Slicing: Methods for Network Slicing in 802.11AX-Type of Systems in 5G Networks," IP.com Disclosure No. IPCOM000250415D | Publication Date: Jul. 12, 2017 | Abstract Only.

* cited by examiner

DISTRIBUTED OVERLAPPING BASIC SERVICE SET SCHEDULING TECHNIQUES FOR INCREASED SPECTRAL EFFICIENCY

TECHNICAL FIELD

Embodiments presented in this disclosure generally relate to communication networks and, more specifically, to improved techniques for scheduling overlapping basic service set (OBSS) traffic in a communication network, e.g., to increase spectral efficiency.

BACKGROUND

In order to address the issue of increasing bandwidth requirements demanded for wireless communication systems, different schemes are being developed to allow devices (e.g., access points (APs), client stations (STAs), etc.) to share channel resources while achieving high data throughputs. As an example, wireless communication standards, such as the Institute of Electrical and Electronics Engineers (IEEE) 802.11 standard, support techniques for allocating resources in the time domain, spatial domain, and the frequency domain. The IEEE 802.11 standard denotes a set of Wireless Local Area Network (WLAN) air interface standards developed by the IEEE 802.11 committee for short-range communications (e.g., tens of meters to a few hundred meters).

In the time domain, transmission opportunities can be allocated to APs and client STAs, e.g., using Enhanced Distributed Channel Access (EDCA). In the spatial domain, multiple-input multiple output (MIMO) techniques can be employed to create multiple independent spatial channels (via multiple transmit and receive antennas) for data transmission. In the frequency domain, orthogonal frequency division multiple access (OFDMA) techniques can be used to allocate individual groups of subcarriers to client STAs as resource units (RUs), e.g., within a data unit. With these resource allocation techniques, the wireless communication system can support dense deployments of APs and client STAs.

As AP and client densities continue to increase along with the support for wider bandwidths with fewer available channels, one issue of concern is the increased interference among basic service sets (BSSs) (referred to as overlapping BSS (OBSS) interference). For example, in some dense deployment scenarios, OBSS interference can lead to reduced data throughput and reduced spectral efficiency in the wireless communication system.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
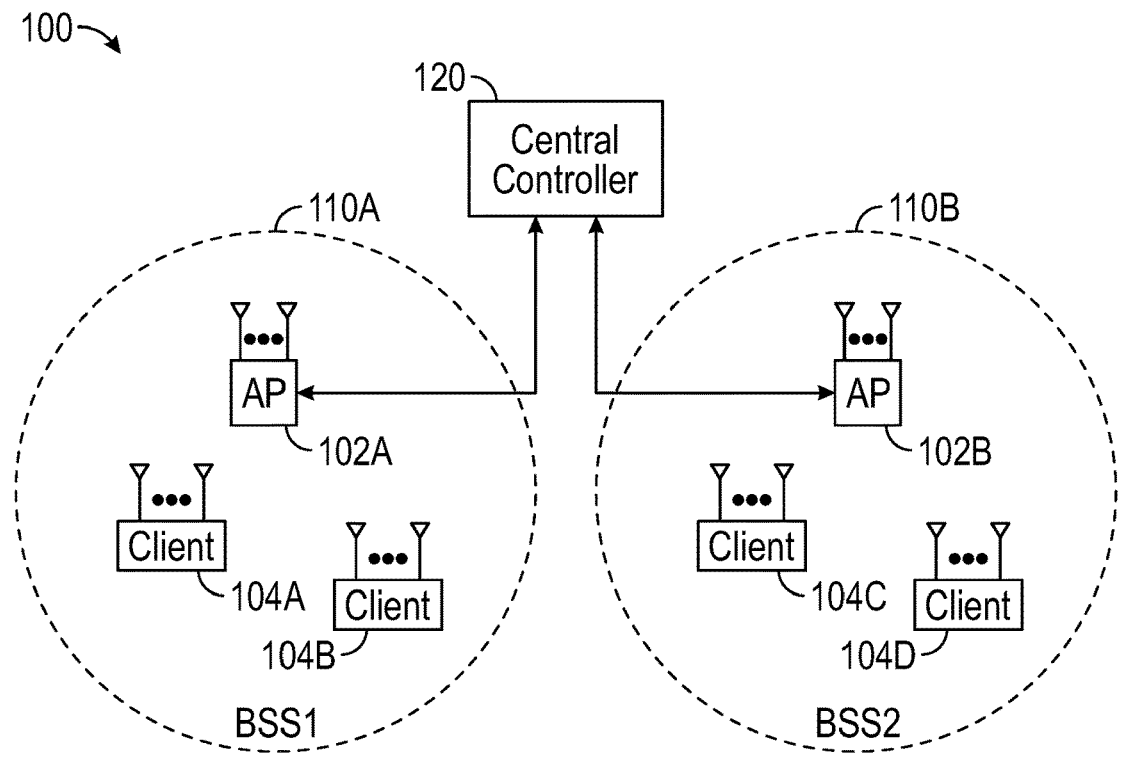
FIG. 1 illustrates an example wireless network, according to one embodiment.

One embodiment presented in this disclosure provides a method for wireless communication performed by an apparatus. The method generally includes determining a first amount of data available to send in a first basic service set (BSS) and determining a second amount of data available to send in a second BSS, wherein the first BSS and the second BSS form an overlapping BSS. The method also includes determining an available amount of resources within a transmission spectrum of the first BSS to share with the second BSS for a coordinated transmission from the first BSS and the second BSS, based at least in part on the first amount of data and the second amount of data. The method further includes generating a first frame comprising an indication of the available amount of resources, and transmitting the first frame to the second BSS.

Another embodiment presented in this disclosure provides an apparatus. The apparatus includes a processor, a transmitter, and a memory containing a program that, when executed by the processor, performs an operation. The operation includes determining a first amount of data available to send in a first basic service set (BSS) and determining a second amount of data available to send in a second BSS, wherein the first BSS and the second BSS form an overlapping BSS. The operation also includes determining an available amount of resources within a transmission spectrum of the first BSS to share with the second BSS for a coordinated transmission from the first BSS and the second BSS, based at least in part on the first amount of data and the second amount of data. The operation further includes generating a first frame comprising an indication of the available amount of resources. The transmitter is configured to transmit the first frame to the second BSS.

Another embodiment presented in this disclosure provides a method for wireless communication performed by an apparatus. The method generally includes receiving a first frame comprising an indication of an available amount of resources within a transmission spectrum of a first basic service set (BSS) that can be shared with the apparatus for a coordinated transmission, where the apparatus is in a second BSS. The method also includes transmitting, in response to the first frame, a second frame as a part of the coordinated transmission using the available amount of resources within the transmission spectrum of the first BSS.

Example Embodiments

In some wireless communication systems, there may be situations in which there are multiple APs from different BSSs (or OBSSs) operating on the same channel, for example, due to the density of the deployment. In these situations, wireless communication systems (e.g., 802.11ax) typically employ the "BSS color" attribute (or parameter) to differentiate between OBSSs and allow for spatial reuse within the wireless communication system. For example, each BSS generally uses a different BSS color, which is an identifier of the BSS (and is carried in the header of a PPDU), to identify the BSS from which a communication frame (e.g., data unit) contained in the PPDU originates. If the receiving device determines that the received signal strength of a frame satisfies a predetermined threshold (e.g., is less than a predetermined OBSS packet detection (PD) level or PPDU detection level), the receiving device may determine that the frame is from an OBSS (e.g., has a different BSS color). On the other hand, if the received signal strength does not satisfy the predetermined threshold, the receiving device may determine that the frame is from the same BSS (e.g., has the same BSS color).

In some cases, however, spatial reuse operations that employ BSS color techniques can lead to inefficient OBSS scheduling, and in turn, reduced spectral efficiency within the wireless communication system. For example, depending on the radio frequency (RF) distance (e.g., path loss) between two or more BSSs, the same BSS color (associated with a particular threshold, such as an OBSS PD dB setting) may or may not be assigned to the BSSs. In these situations, the receiving device may not be able to determine whether a received communication frame belongs to the same BSS or an OBSS.

In addition, conventional techniques that attempt to address OBSS scheduling in dense deployment scenarios lead to reduced performance of the communication system. One conventional technique, for example, involves dividing bandwidth across multiple OBSS APs in order to have the OBSS APs operate on independent channels. However, limiting the bandwidth that is allocated to each BSS can limit the peak capacity of that BSS in cases when the OBSS usage is below a threshold (or is zero in some cases). For example, assuming an 80 MHz channel is divided between two OBSS APs ($AP_1$ and $AP_2$) and the network usage from $AP_2$ is 0%, $AP_1$ would not be able to use the entire 80 MHz bandwidth for communications. Another conventional technique involves performing collision avoidance (e.g., request-to-send (RTS)/clear-to-send (CTS) exchange) on each of the subchannels (e.g., 20 MHz subchannels) of an operating bandwidth before every transmission. However, this approach can impact efficiency, e.g., due to the additional frame exchange(s) and increased chances that a single exchange failure can cause a blackout of an entire 20 MHz subchannel.

Accordingly, embodiments herein described improved techniques for scheduling OBSS communications (or traffic) within a wireless communication system, e.g., for increased spectral efficiency.

In one embodiment, a scheduling device (e.g., AP) uses information associated with the OBSSs (e.g., interference patterns, AP and client STA positions, BSS color configuration, etc.) to determine a transmission schedule (for the AP and neighboring AP(s)) and resource unit (RU) vector (for the neighboring AP(s)). The RU vector includes an indication of the resource allocation strategy (or plan) to be used by the neighboring AP(s), e.g., when allocating RUs for a coordinated multi-user (MU) transmission. For example, in one embodiment, the RU vector can include, for each AP in an OBSS, (1) an indication of an amount of resources (e.g., the number of subcarriers) within the scheduling device's transmission spectrum that can be shared (or used) by the OBSS, (2) the anchor subcarrier for the AP's resource allocation, and (3) the direction (from the anchor subcarrier) in which the AP's resource allocation can grow.

The scheduling device generates and transmits an OBSS trigger frame (with an indication of the transmission schedule and RU vector) to each of the neighboring APs in the OBSSs. The APs and the neighboring APs may then participate in a coordinated MU transmission (e.g., by transmitting a high efficiency (HE) MU physical layer convergence protocol (PLCP) protocol data unit (PPDU)), based in part on the transmission schedule and RU vector within the OBSS trigger frame. In one embodiment, the MU transmission from the AP(s) may include a trigger frame (e.g., HE trigger frame) for the respective client STA(s) to send a coordinated MU transmission. For example, the trigger frame may include a resource allocation for the client STAs that is consistent with the RU vector. The client STAs may then transmit a frame (e.g., HE trigger-based (TB) PPDU) using the resource allocation indicated in the trigger frame. By enabling a network entity to trigger and share the PPDU resources with one or more PPDUs from different BSS(s), embodiments can improve spectral efficiency via spatial reuse, in cases of dense OBSS deployments.

Note, the techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an AP or a client STA. Further, for the sake of clarity, many of the embodiments use a single OBSS scenario as a reference example of an OBSS scenario in which the techniques presented herein can be used to dynamically share resources to increase spectral efficiency. It is to be noted that the techniques presented herein can also be used in multiple OBSS scenarios.

As used herein, "frame" may be used to refer to different frame formats, depending on the particular layer/sublayer and the context in which it is used in the description. For example, a "frame" can refer to a trigger frame (e.g., HE trigger frame), a PPDU, a frame within a PPDU (e.g., medium access control (MAC) protocol data unit (MPDU)/ PLCP service data unit (PSDU)), an aggregated frame within a PPDU (e.g., aggregated MDPU (AMPDU)), etc. Further, note that many of the following embodiments are described with reference to PPDUs and frames. It is to be understood that the content of a non-payload field of a PPDU (e.g., a Signal field, a Service field, etc.). can be replaced by content in other layers or sublayers, such as frames (MAC sublayer) or packets (Layer 3 (L3)). Similarly, the content in frames can be replaced by content in other layers or sublayers such as a non-payload field of PPDUs (Layer 1 (L1)) or packets (L3).

FIG. 1 illustrates an example wireless network 100 in which one or more techniques described herein can be implemented, according to one embodiment. The wireless network 100 includes an AP 102A, AP 102B, and client STAs 104 A-D. An AP is generally a fixed station that communicates with the client STAs and may also be referred to as a base station, wireless device, or some other terminology. A client STA may be fixed or mobile and also may be referred to as a mobile STA, a client, a STA, a wireless device, or some other terminology.

As used herein, an AP along with the STAs associated with the AP may be referred to as a BSS. Here, AP 102A and client STAs 104 A-B are shown as part of a first BSS (BSS1) 110A and AP 102B and client STAs 104 C-D are shown as part of a second BSS (BSS2) 110B. The AP 102A and 102B may be neighboring (peer) APs. The APs 102A and 102B may communicate with one or more client STAs 104 A-D on the downlink and uplink. The downlink (e.g., forward link) is the communication link from the AP 102 to the client STAs 104, and the uplink (e.g., reverse link) is the communication link from the client STAs 104 to the AP 102. In some cases, a client STA may also communicate peer-to-peer with another client STA.

A central controller 120 couples to and provides coordination and control for the APs 102 A-B. For example, the central controller 120 may handle adjustments to radio frequency power, channels, authentication, and security for the APs. The central controller 120 may communicate with the APs 102 A-B via a backhaul. The APs 102 A-B may also communicate with one another, e.g., directly or indirectly via a wireless or wireline backhaul.

In some embodiments, portions of the coverage area of BSS1 110A may overlap with portions of the coverage area of BSS2 110B, leading to an OBSS situation. Communications by the AP 102A with the client STAs 104 A-B may referred to as intra-BSS communications. Similarly, communications by the AP 102B with the client STAs 104 C-D may be referred to as intra-BSS communications. Communications by the AP 102A with the client STAs 104 C-D in BSS2 110B may be referred to as OBSS communications and communications by the AP 102B with the client STAs 104 A-B in BSS1 110A may be referred to as OBSS communications.

In some embodiments, the wireless network 100 (e.g., 802.11ax) may support resource allocation in the time domain, spatial domain, and/or frequency domain, and/or time domain. In the spatial domain, MU-MIMO techniques can be employed to enable coordinated MU transmissions (e.g., simultaneous transmissions in the downlink and uplink) via allocated spatial streams. For downlink (DL) MU-MIMO, an AP (e.g., AP 102A) can simultaneously transmit frames to multiple client STAs (e.g., client STAs 104 A-B) through allocated spatial streams. For uplink (UL) MU-MIMO, multiple client STAs can simultaneously transmit frames to the AP (e.g., AP 102A) through allocated spatial streams.

In the frequency domain, the channel(s) are divided into multiple RUs with the same or different bandwidth, where multiple OFDM subcarriers combine to form a single RU. OFDMA techniques can be used to individually allocate groups of subcarriers (for downlink and uplink) to client STAs as RUs on a per-PPDU basis. That is, an AP (e.g., AP 102A) can allocate a RU (e.g., a set of subcarriers (or tones)) to each client STA (e.g., client STAs 104 A-B) in the same frame (e.g., PPDU). The allocated RU can be used for sending or receiving frames. In some embodiments, both MU-MIMO and OFDMA can be employed to allow multiple client STAs to simultaneously send or receive frames in the same RU through MU-MIMO.

In one reference example of a downlink OFDMA operation, the AP (e.g., AP 102A) can determine the number of client STAs (e.g., client STAs 104 A-B) and the RU allocation size for each client STA to allocate in a transmission opportunity (TXOP), and indicate this information in a field (e.g., HE-SIG-B field) in the preamble of the PPDU. The AP can then transmit downlink data to multiple client STAs in their allocated RU, e.g., via a MU-PPDU. In some cases, the AP may can request block acknowledgement (ACK) from the multiple client STAs, e.g., via a MU block acknowledgement request (MU-BAR). In response, the client STAs can send block ACKs to the AP, e.g., via a MU block ACK (MU-BA).

In one reference example of an uplink OFDMA operation, the AP (e.g., AP 102A) can determine which client STAs (e.g., client STAs 104 A-B) to poll for data and the RU allocation size for each client STA. The AP can request or poll data from the client STAs with a trigger frame, e.g., HE trigger frame. In response to the trigger frame, the client STAs respond with data, e.g., via an uplink MU-PPDU. The AP can then respond with an ACK (e.g., MU-BA).

Figure 2:
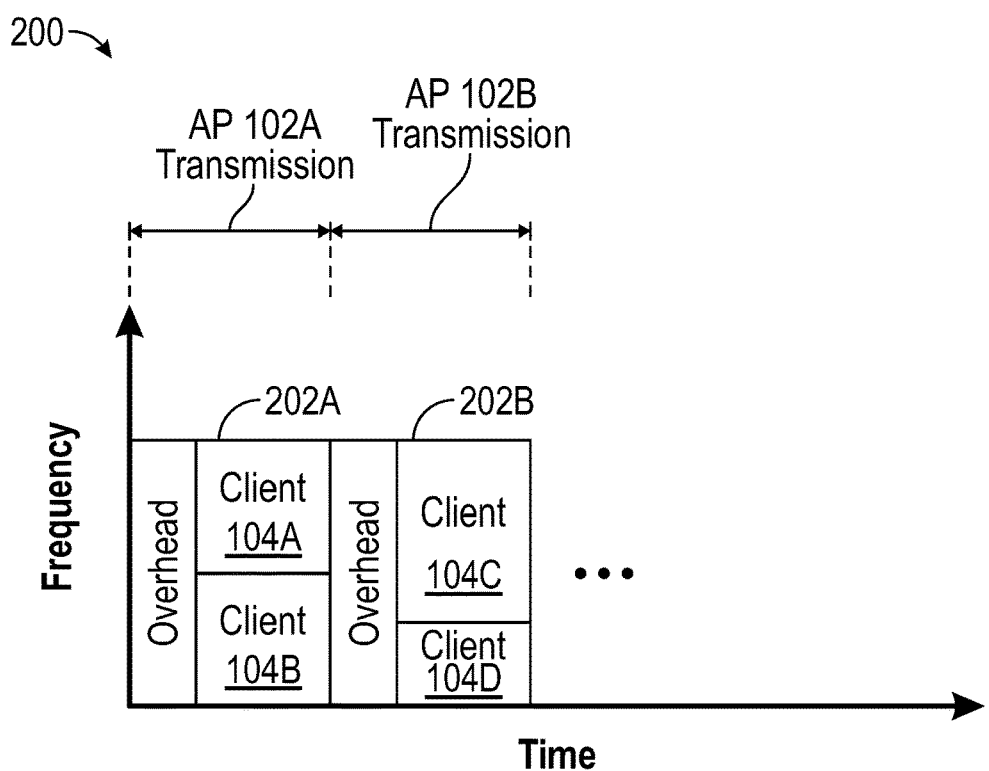
FIG. 2 illustrates an example transmission scenario in the wireless network, according to one embodiment.

The OFDMA schedule (for transmission) within a BSS is typically independently determined by each AP (e.g., AP 102A for BSS 110A, AP 102B for BSS 110B, etc.) acting independently of other APs. However, in dense OBSS deployments, this can lead to an inefficient allocation of RUs, reducing the spectral efficiency within the wireless network 100. For example, in this conventional scheduling approach, each AP preparing for an OFDMA transmission may attempt to max out its operating bandwidth (e.g., by filling (allocating) RUs) and determine a given PPDU length for the OFDMA transmission based on the allocated RUs. In cases where there is a small amount of traffic per traffic identifier (TID) (e.g., below a threshold amount), the conventional scheduling approach can result in each AP transmitting several small PPDUs, reducing the spectral efficiency. FIG. 2, for example, depicts a transmission scenario 200 where multiple small PPDUs 202A, 202B are transmitted by APs 102A and 102B over time. In this example, each PPDU 202 includes an overhead portion (e.g., preamble) and a data portion.

Figure 3:
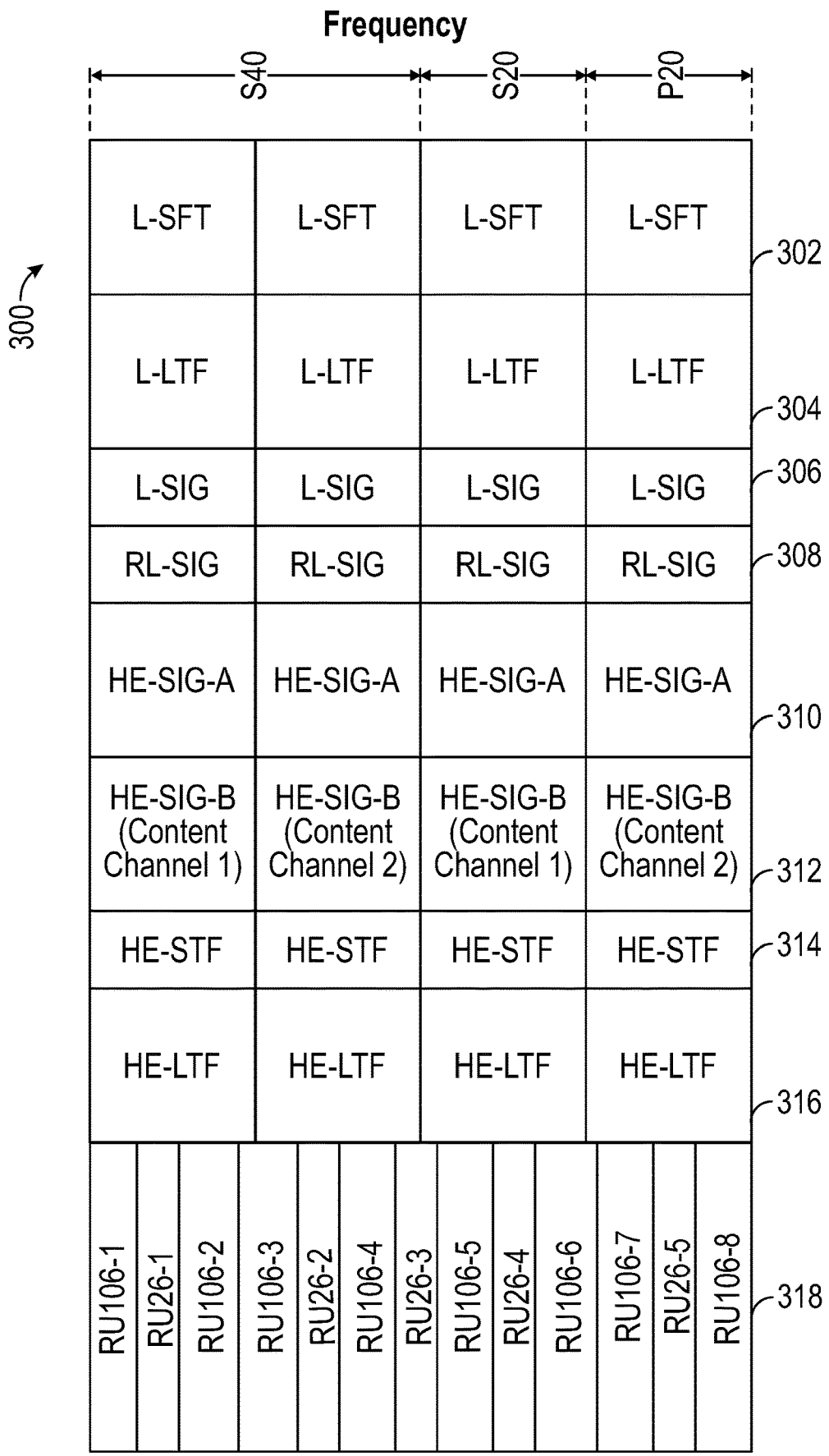
FIG. 3 illustrates an example format of a high efficiency (HE) multi-user (MU) data frame, according to one embodiment.

Each AP 102 A-B may use a MU format (or structure) (e.g., HE MU PPDU format) for its respective PPDU 202. FIG. 3 depicts a reference example of an 80 MHz HE MU PPDU 300 (based on the HE MU PPDU format) that can be used by each AP 102 A-B to simultaneously transmit data to multiple client STAs. The MU format 300 can be used to enable simultaneous transmission via OFDMA and/or MU-MIMO. As shown, the HE MU PPDU 300 includes a single PPDU structure that includes preamble (e.g., legacy and HE preambles) and data portions. In particular, the legacy preamble of the HE MU PPDU 300 includes a legacy (or non-high-throughput (HT)) Short Training field (L-STF) 302, a legacy Long Training field (L-LTF) 304, and a legacy SIGNAL field (L-SIG) 306. The HE preamble of the HE MU PPDU 300 includes a repeated legacy SIG field (RL-SIG) 308, a HE SIGNAL A field (HE-SIG-A) 310, a HE SIGNAL B field (HE-SIG-B) 312, a HE-STF 314, and one or more HE-LTFs 316.

The data portion includes a data field 318 for carrying one or more PLCP service data units (PSDUs) (also referred to as MPDUs from the perspective of the MAC layer). Although not shown, in some embodiments, the data portion of the HE MU PPDU 300 may include a packet extension (PE) field after the data field 318, e.g., to extend the time for a receiver to process data. In this example, the 80 MHz channel for the data field 318 is divided into multiple RUs. As shown, each 20 MHz subchannel is divided into three RUs: a 106-tone RU, a 26-tone RU, and a 106-tone RU. Each RU within the data field 318 may be assigned (allocated) to a different client STA. Note that while depicts an 80 MHz HE MU PPDU, in other embodiments, the HE MU PPDU can be sent over other bandwidths (e.g., 20 MHz, 40 MHz, 160 MHz, etc.). Similarly, the RU division depicted for HE MU PPDU 300 is provided as a reference example of how the bandwidth can be divided into RUs with different sizes. In other embodiments, depending on the bandwidth, different size RUs (e.g., 52-tone, 242-tone, 484-tone, etc.) can be supported.

Assuming an AP uses the HE MU PPDU 300 for the PPDU 202 depicted in FIG. 2, the AP's transmission may be assigned to start from the top subcarrier in the primary 20 MHz (P20) and move downward (e.g., into the secondary 20 MHz (S20) and secondary 40 MHz (S40)) depending on the amount of data that is transmitted. In some embodiments, the AP, using the techniques presented herein, can transmit the same amount of MU data in a smaller bandwidth PPDU (e.g., 50 MHz PPDU) as in the larger bandwidth PPDU (e.g., 80 MHz PPDU) by elongating the PPDU, e.g., when the AP determines that another BSS can share resources with the AP.

Figure 4:
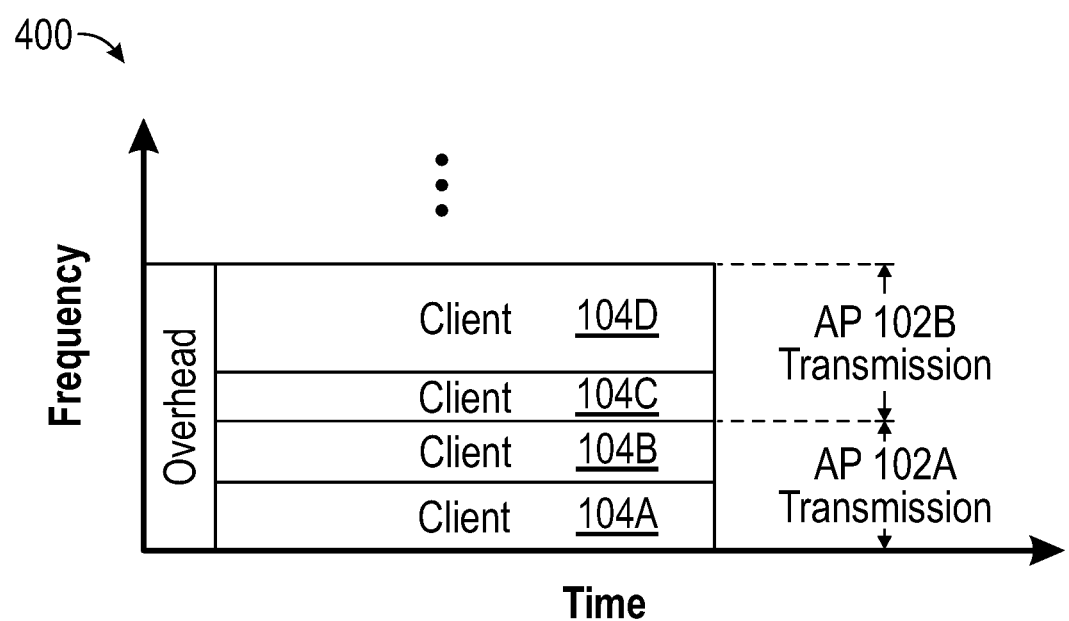
FIG. 4 illustrates an example transmission scenario using shared resources in the wireless network, according to one embodiment.

FIG. 4 depicts a transmission scenario 400 in an OBSS scenario where a first AP of a first BSS (e.g., AP 102A of BSS1 110A) shares its transmission spectrum with a second AP of a second BSS (e.g., AP 102B of BSS2 110B), according to one embodiment. As shown, AP 102B is able to use a portion of AP 102A's resources in order to share the same frequency spectrum as AP 102A and transmit at the same time as AP 102A.

In one embodiment, AP 102A may share its transmission spectrum (to accommodate AP 102B) by elongating its PPDU. Here, for example, compared to the transmission scenario 200, the length of each PPDU transmitted by the APs 102 A-B in the transmission scenario 400 is increased, but the amount of resources allocated to the client STAs 104 A-D in the transmission scenario 400 and the amount of resources allocated to the client STAs 104 A-D in the transmission scenario 200 are the same. Moreover, because the transmissions by AP 102A and AP 102B are overlapping in time, embodiments enable a single set of physical layer (PHY) and medium access control (MAC) overheads, which occupies the entire spectrum, to be used, e.g., as opposed to a set of PHY and MAC for each PPDU transmission as depicted in transmission scenario 200. By allowing the APs 102 A-B in OBSSs to share the same frequency spectrum, embodiments provide better spectrum reuse and increased spectral efficiency, relative to conventional OFDMA scheduling techniques.

Figure 5:
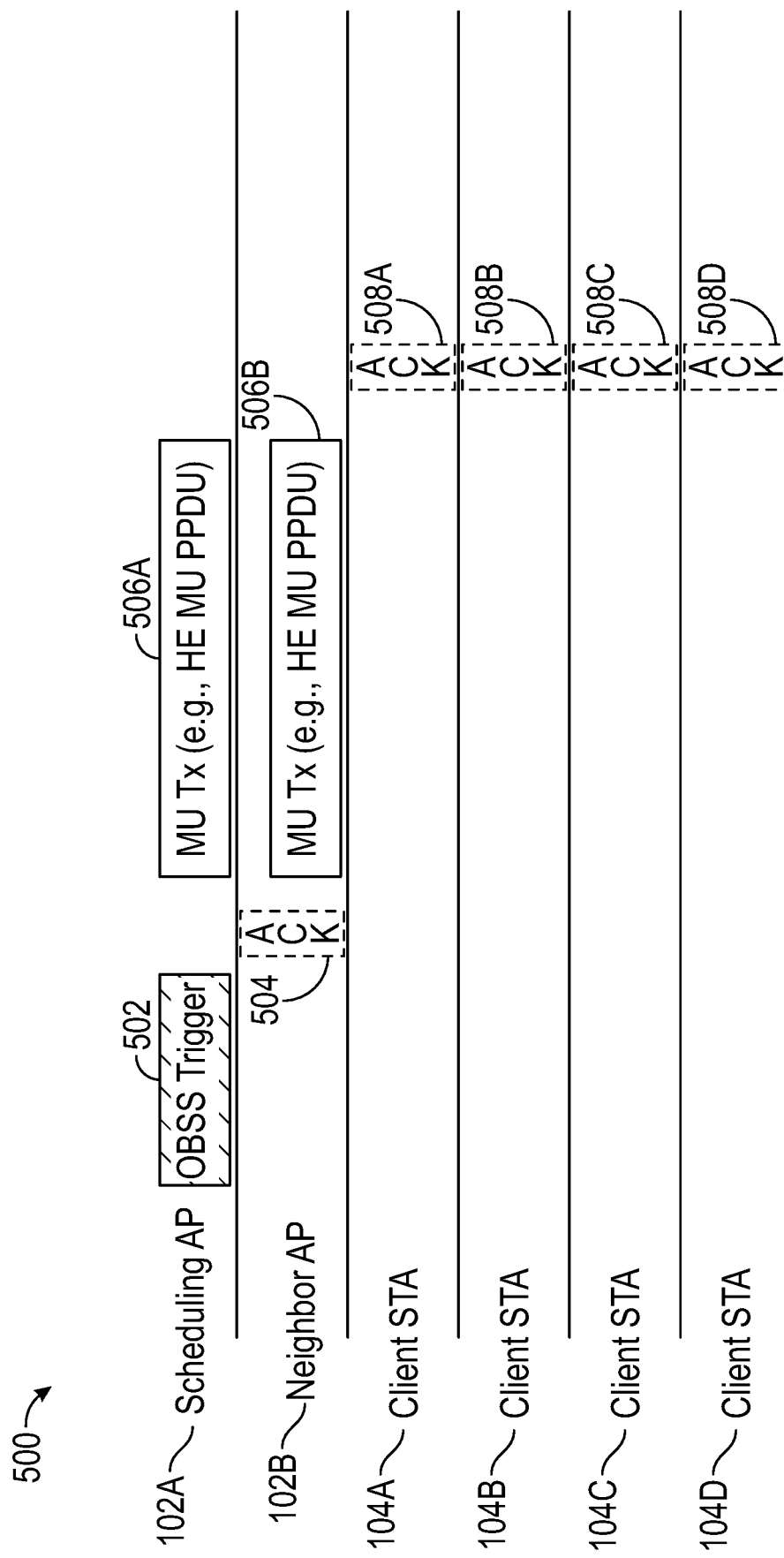
FIGS. 5-8 illustrate example communication protocols for triggering simultaneous communications from different BSSs using shared resources, according to one embodiment.

FIG. 5 illustrates an example communication protocol 500 for triggering simultaneous transmissions from different BSSs, e.g., for increased spectral efficiency, according to one embodiment. In this example, a scheduling AP (e.g., AP 102A) determines to share its PPDU resources with PPDU (s) of another AP in an OBSS (e.g., AP 102B). Note that while the AP 102A is used herein as an example of the scheduling AP, in other embodiments, the scheduling AP (or apparatus) can be another AP (e.g., AP 102B) or another device (e.g., central controller 120).

In one embodiment, the scheduling AP may determine to share its resources based on knowledge of the load in the OBSS. For example, the scheduling AP can determine (e.g., through a control plane process, signal detection, etc.) that there are neighbor AP(s) operating in proximity to the scheduling AP. The scheduling AP and neighbor AP(s) may then exchange information regarding the respective loads in the different BSSs, location of devices, etc. The information obtained (from each neighbor AP) during this exchange can include, for example, the neighbor AP's operating channel (including primary sub-channel(s)) and bandwidth, distance (pathloss) and azimuthal angle of the neighbor AP from the current BSS, color of the neighbor BSS, OBSS_PD threshold configured at the current BSS and the OBSS, neighbor AP's past bandwidth usage, etc. The scheduling AP and neighbor AP(s) may exchange information about their respective loads via a wired medium or wireless medium.

Using the information obtained from the neighbor AP(s), the scheduling AP can determine a transmission schedule for a coordinated MU transmission (e.g., simultaneous DL MU transmission) by the scheduling AP and the neighbor AP(s). In one embodiment, for example, the transmission schedule can indicate the length that is to be used for the coordinated MU transmission (e.g., HE MU PPDU). The scheduling AP can also determine a RU vector that indicates a set of constraints to be used by the neighbor AP(s) when allocating RUs for the coordinated MU transmission. In one embodiment, for example, the RU vector can indicate, for each neighbor AP, at least one of: (1) the amount of resources (e.g., number of subcarriers, number of RUs, etc.) within the scheduling AP's transmission spectrum that can be shared by the neighbor AP; (2) the anchor (or starting) subcarrier within the scheduling AP's transmission spectrum to begin allocating RUs; and (3) the direction (from the anchor subcarrier) in which the neighbor AP's resource allocation (within the scheduling AP's transmission spectrum) can grow. In one embodiment, the scheduling AP generates an OBSS trigger frame 502 that includes an indication of the transmission schedule and the RU vector information.

As shown in FIG. 5, the scheduling AP transmits the OBSS trigger frame 502 to trigger the neighbor AP(s) to share the scheduling AP's resources in a coordinated MU transmission. The transmission of the OBSS trigger frame 502 may be followed by an optional ACK(s) 504 from the neighbor AP(s). In response to the OBSS trigger frame 502, the neighbor AP(s) participate in a coordinated MU transmission using a shared spectrum. In one embodiment, the scheduling AP and the neighbor AP(s) can transmit HE MU PPDUs 506A and 506B to one or more client STAs 104 A-D, based on the constraints indicated in the RU vector within the OBSS trigger frame 502. The coordinated MU transmission may be followed by optional ACKs 508 A-D from the client STAs 104 A-D. In one embodiment, the ACK(s) 508 A-D can be sent in parallel, e.g., using OFDMA and/or MU-MIMO. In another embodiment, the ACK(s) 508 A-D can be sent sequentially.

Figure 6:
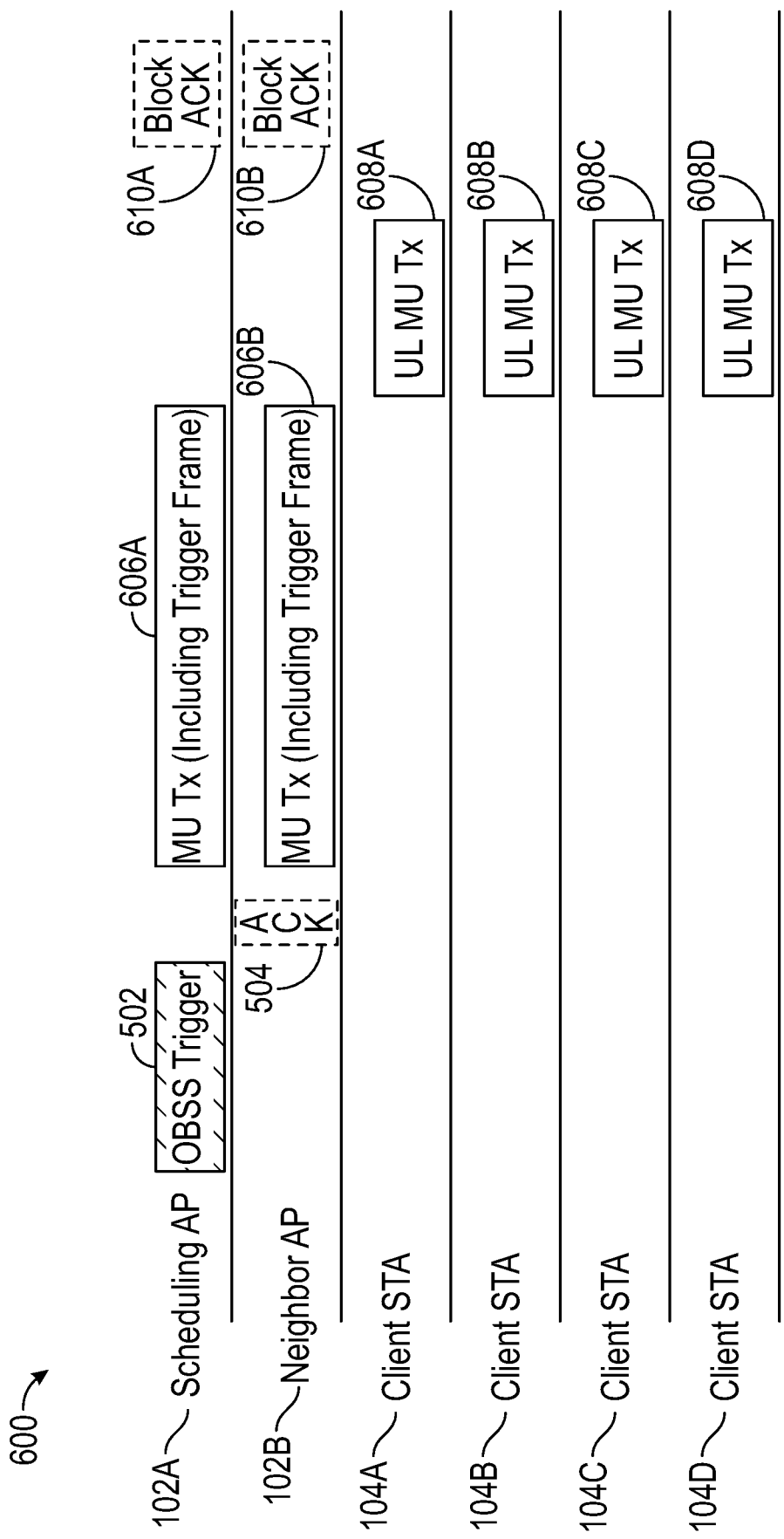

FIG. 6 illustrates another example communication protocol 600 for triggering simultaneous transmissions from different BSSs, e.g., for increased spectral efficiency, according to one embodiment. Here, after the scheduling AP transmits the OBSS trigger frame 502, the scheduling AP and neighbor AP(s) participate in a coordinated MU transmission. That is, the scheduling AP and neighbor AP(s) send HE MU PPDUs 606A and 606B using the scheduling AP's resources according to the constraints indicated in the RU vector within the OBSS trigger frame 502.

Compared to the HE MU PPDUs 506A and 506B in communication protocol 500, the HE MU PPDUs 606A and 606B include (second) HE trigger frames to trigger simultaneous uplink transmissions from the client STAs 104 A-D. In one embodiment, the HE MU PPDUs 606A and 606B may include the HE trigger frame for each client STA in the data portion (e.g., in the PSDU) of the HE MU PPDU 606A, 606B for the client STA. In response to the HE trigger frames, each client STA 104 A-D participates in a coordinated uplink MU transmission. Here, for example, the client STAs 104 A-D can transmit HE TB PPDUs 608 A-D. The HE TB PPDUs 608 A-D may have a similar format as the HE MU PPDU 300, except the HE TB PPDUs may not include HE-SIG-B. The coordinated uplink MU transmission may be followed by optional block ACKs 610A and 610B from the scheduling AP and neighbor AP(s), respectively.

Figure 7:
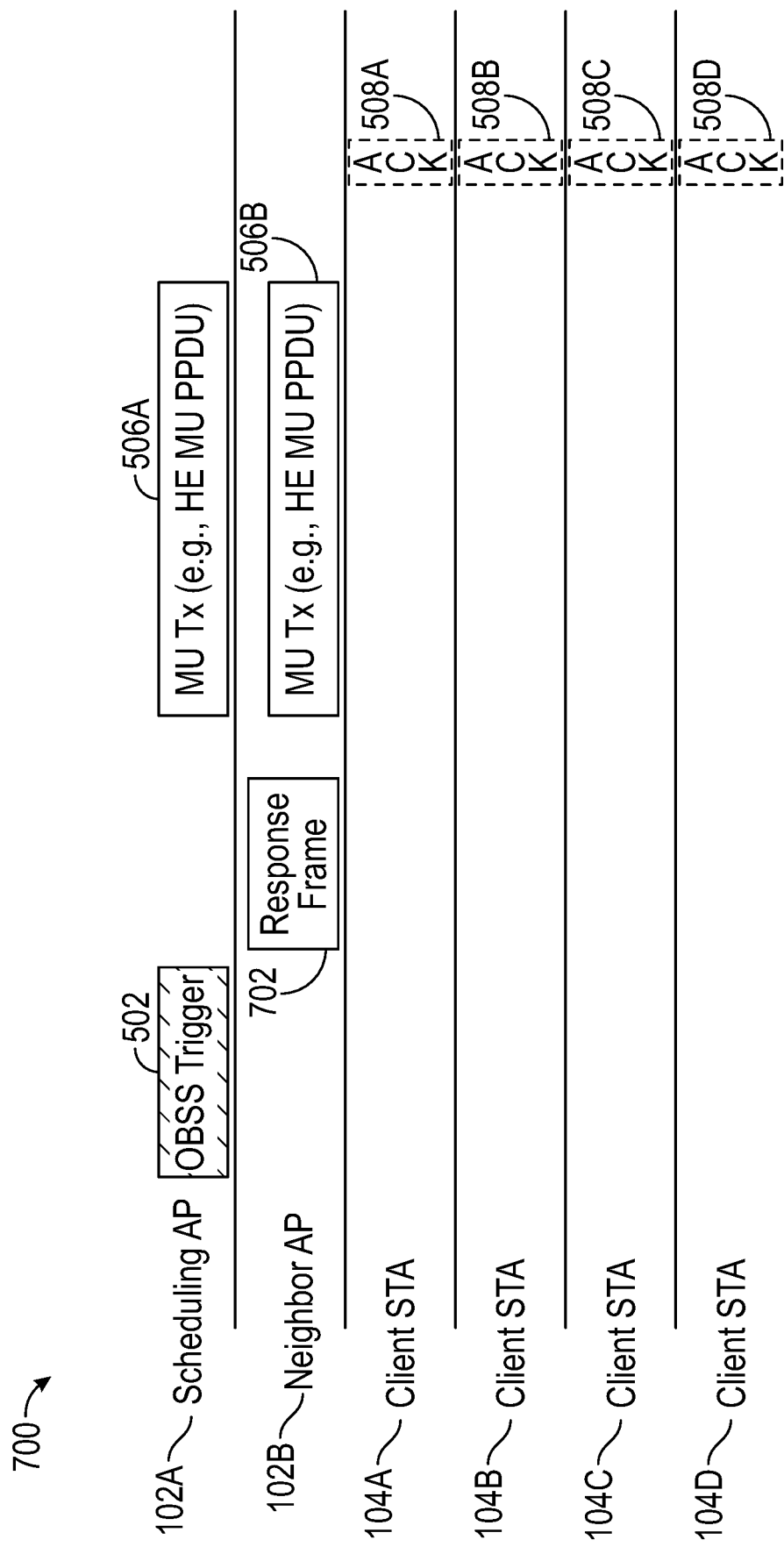

FIG. 7 illustrates another example communication protocol 700 for triggering simultaneous transmissions from different BSSs, e.g., for increased spectral efficiency, according to one embodiment. Compared to the communication protocol 500, in this embodiment, the neighbor AP(s) transmits a response frame 702, in response to the OBSS trigger frame 502, that indicating whether the neighbor AP(s) will use the scheduling AP's resources for a coordinated MU transmission.

In one embodiment (which is not shown), the response frame 702 can indicate that the neighbor AP will not use the scheduling AP's resources. In response to receiving a response frame 702 with a "No" indication, the scheduling AP can use the non-shared resources for its MU transmission. In another embodiment (which is shown here), the response frame 702 can indicate that the neighbor AP will use the scheduling AP's resources. As shown, for example, in response to receiving a response frame 702 with a "Yes" indication, the scheduling AP and neighbor AP(s) participate in a coordinate transmission (e.g., by sending HE MU PPDUs 506A and 506B).

In yet another embodiment, the response frame 702 can include a negotiation of the amount of resources that the neighbor AP(s) can use. For example, the response frame 702 can indicate that the neighbor AP will use a subset of the resources that are available to be shared with the neighbor AP. In response to receiving a response frame 702 indicating that a subset of resources will be used, the scheduling AP can proceed to use the remaining subset of resources for its MU transmission. Further, although not shown, in some embodiments, the response frame 702 can be incorporated in other communication protocols described herein, such as the communication protocol 600.

Figure 8:
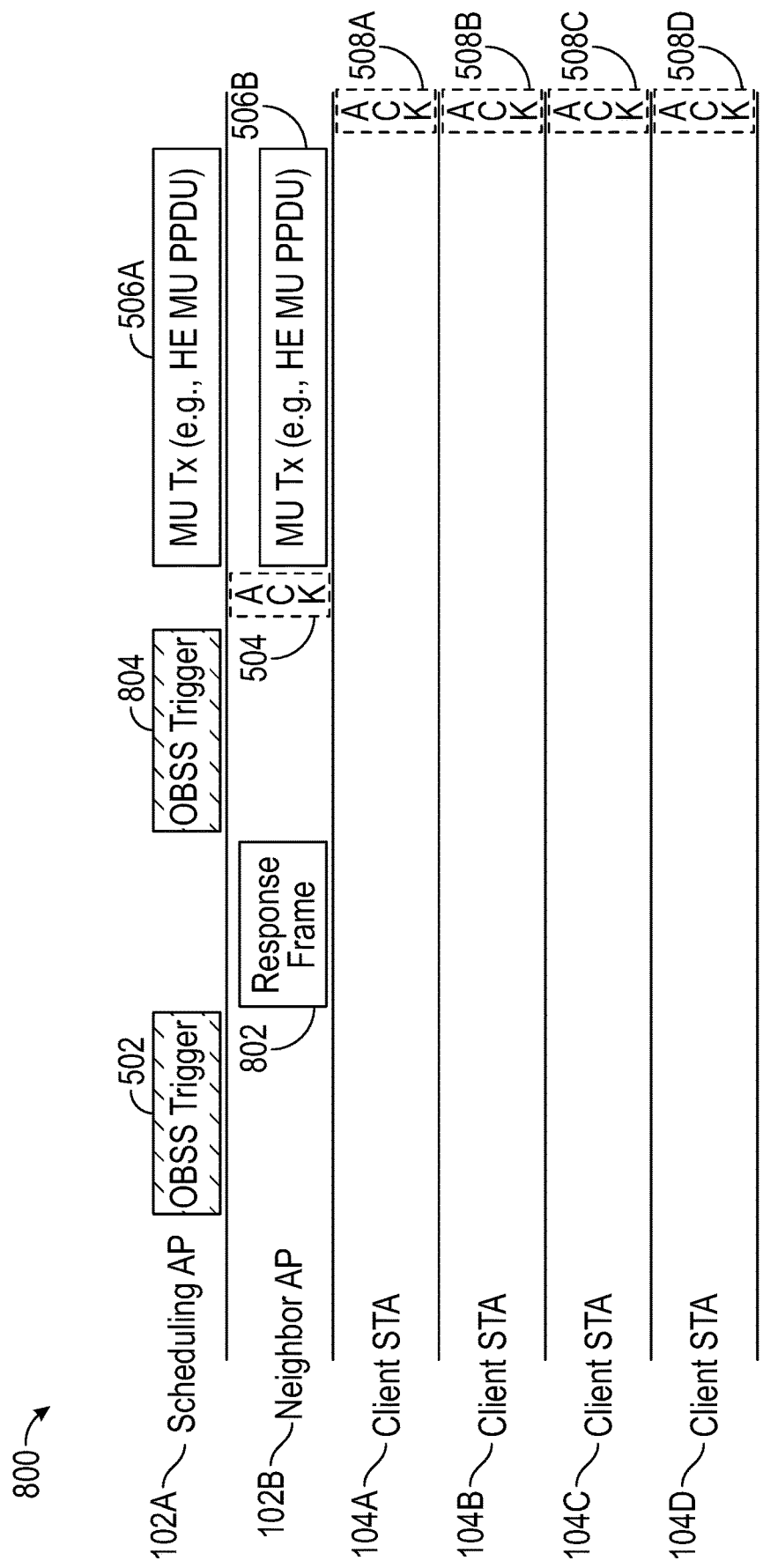

FIG. 8 illustrates yet another example communication protocol 800 for triggering simultaneous transmissions from different BSSs, e.g., for increased spectral efficiency, according to one embodiment. Compared to the communication protocol 500, in this embodiment, the neighbor AP(s) can negotiate with the scheduling AP (e.g., after receiving the OBSS trigger frame 502) regarding an increased amount of shared resources (e.g., above what was offered) for the coordinated MU transmission. Here, for example, in response to the OBSS trigger frame 502, the neighbor AP(s) transmits a response frame 802 to the scheduling AP. The response frame 802 indicates that the neighbor AP desires to use an amount of resources that exceeds the available amount of resources indicated in the OBSS trigger frame 502. After receiving the response frame 802, the scheduling AP can determine a final amount of resources to share with the neighbor AP(s) and transmit another OBSS trigger frame 804 with an indication of the final amount of resources.

In some embodiments, the scheduling AP may grant the neighbor AP(s) request for additional resources. In some embodiments, the scheduling AP may indicate (in the OBSS trigger frame 804) a different amount of resources that is above the amount indicated in the OBSS trigger frame 502, but below the amount requested in the response frame 802. In response to the OBSS trigger frame 804, the scheduling AP and neighbor AP(s) participate in a coordinated MU transmission, e.g., based on the constraints indicated in the OBSS trigger frame 804. By allowing neighbor AP(s) to negotiate for the amount of resources they can use, embodiments enable the scheduling AP to determine an optimized final mapping of what will be used by different AP(s) for the coordinated MU transmission. Although not shown, in some embodiments, the response frame 802 can be incorporated in other communication protocols described herein, such as the communication protocol 600.

Figure 9A:
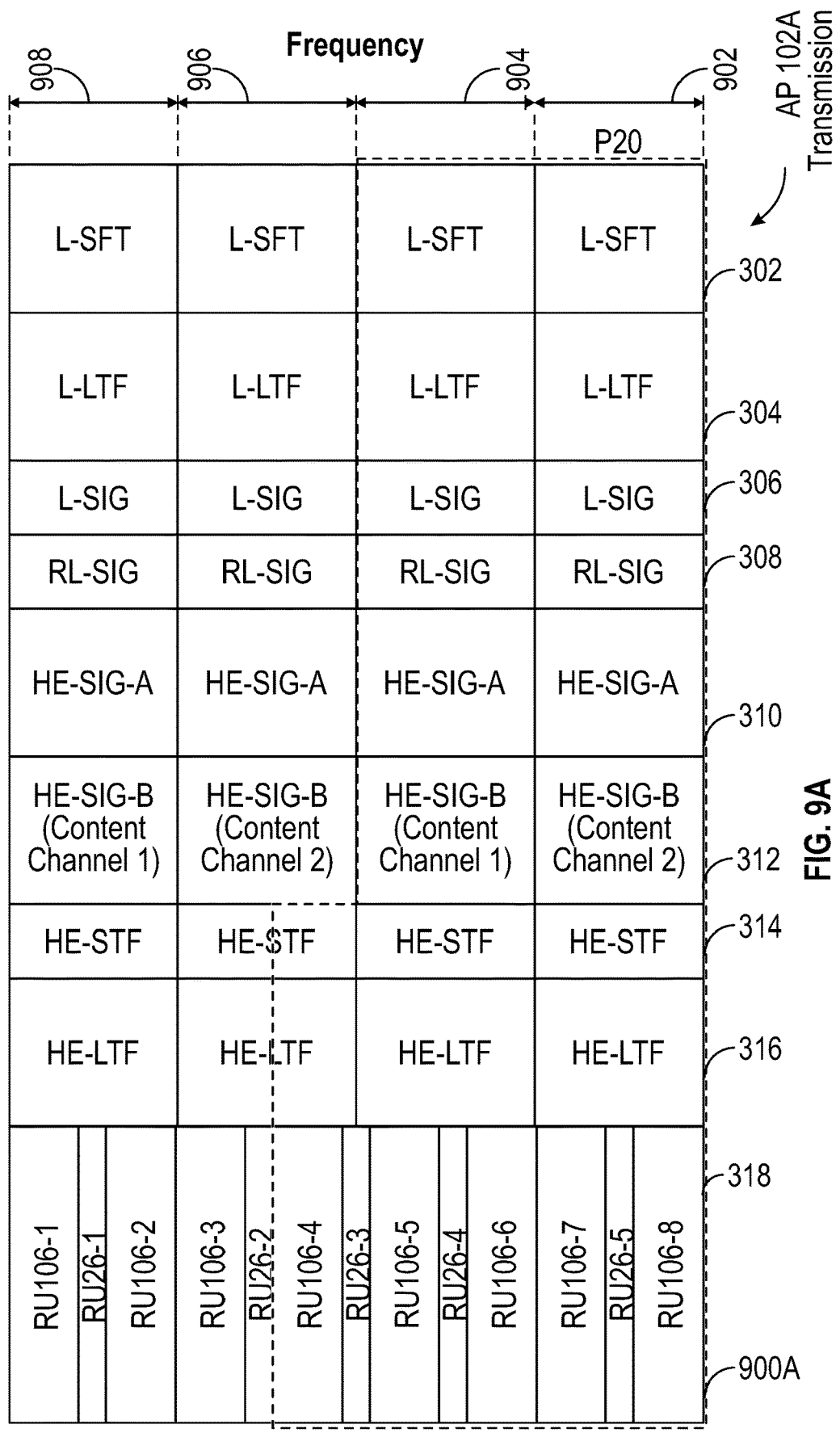
FIGS. 9A-9B illustrate example HE MU data frames transmitted by multiple APs sharing the same frequency spectrum, according to one embodiment.
Figure 9B:
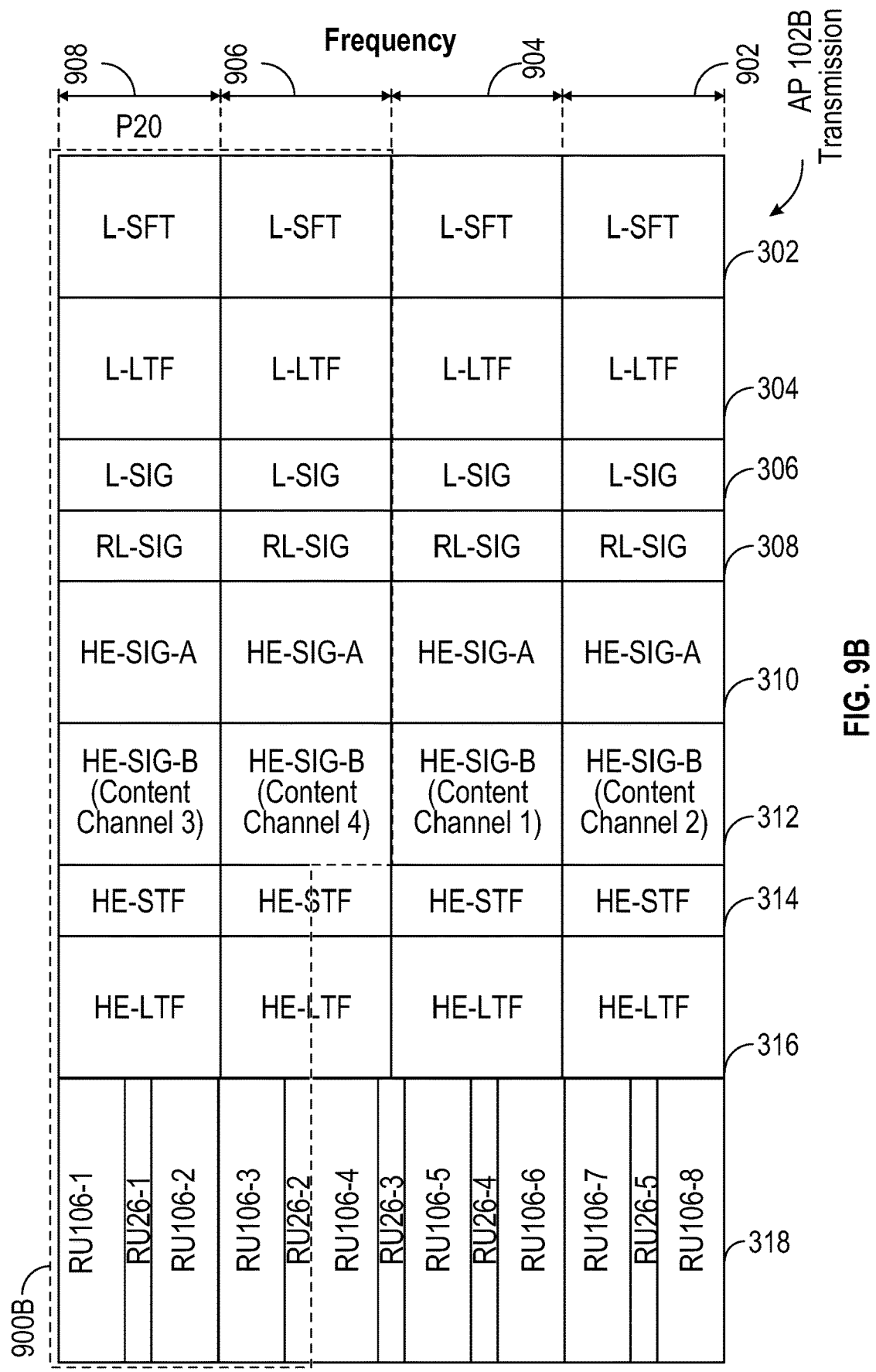

FIG. 9 depicts example HE MU PPDUs 900A and 900B transmitted by APs 102A and 102B sharing the same frequency spectrum, according to one embodiment. In this example, AP 102A and 102B are in an OBSS scenario where they are operating on the same channel (e.g., 80 MHz channel) but have different primary subchannels (e.g., 20 MHz subchannels). For example, AP 102A is on primary subchannel 902 and AP 102B is on primary subchannel 908. In this situation, AP 102A can decide to share a portion of its subcarriers with other APs in an OBSS (e.g., AP 102B).

In one embodiment, after deciding to share resources with another AP (e.g., AP 102B), the AP 102A may send an OBSS trigger frame (e.g., OBSS trigger frame 502) to the other AP. The RU vector may indicate, e.g., that the AP 102B is allowed to use (share) 30 MHz of the 80 MHz HE MU PPDU 900A for MU data (e.g., HE data 318), the anchor subcarrier (e.g., bottom tone of RU 106-1 in subchannel 908) for AP 102B to start allocating RUs, and the direction (e.g., positive frequency direction towards primary subchannel 902) in which the AP 102B's resource allocation can grow.

As shown, AP 102A transmits a HE MU PPDU 900A where L-STF 302, L-LTF 304, L-SIG 306, RL-SIG 308, HE-SIG-A 310, and HE-SIG-B are sent on (the top) 2×20 MHz subchannels 902 and 904. The AP 102A then adds partial bandwidth (e.g., 10 MHz of the middle 20 MHz subchannel 906) and transmits HE-STF 314, HE-LTF 316, and HE data 318 of the HE MU PPDU 900A on 50 MHz (2×20 MHz+10 MHz). At the same time, AP 102B transmits a HE MU PPDU 900B where L-STF 302, L-LTF 304, L-SIG 306, RL-SIG 308, HE-SIG-A 310, and HE-SIG-B are sent on (the bottom) 2×20 MHz subchannels 906 and 908. HE-STF 314, HE-LTF 316, and HE data 318 of the HE MU PPDU 900B are then sent on 30 MHz (e.g., 20 MHz subchannel 508+10 MHz of the 20 MHz subchannel 906).

In some embodiments, APs 102A and 102B can puncture the subcarriers that is it not using for their respective HE MU PPDU transmissions. For example, in one particular embodiment, the HE MU PPDUs 900A and 900B may have a consistent HE-SIG-A 310 and indicate (e.g., in the HE SIG-A 310) that a punctured preamble was used on the full (80 MHz) bandwidth. Doing so prevents client STAs from attempting to combine HE-SIG-B 312 that may not be replicated over the full bandwidth. Thus, in the example depicted in FIG. 9, AP 102A starts with its primary 20 MHz subchannel 902, then the 20 MHz subchannel 906, and lastly AP 102B's primary 20 MHz subchannel 908. In general, the scheduling AP may include information in the OBSS trigger 502 indicating that at least one or more of the legacy components and the HE components of the HE MU PPDU preamble is to be consistent across the full bandwidth for the coordinated MU transmission.

Figure 10:
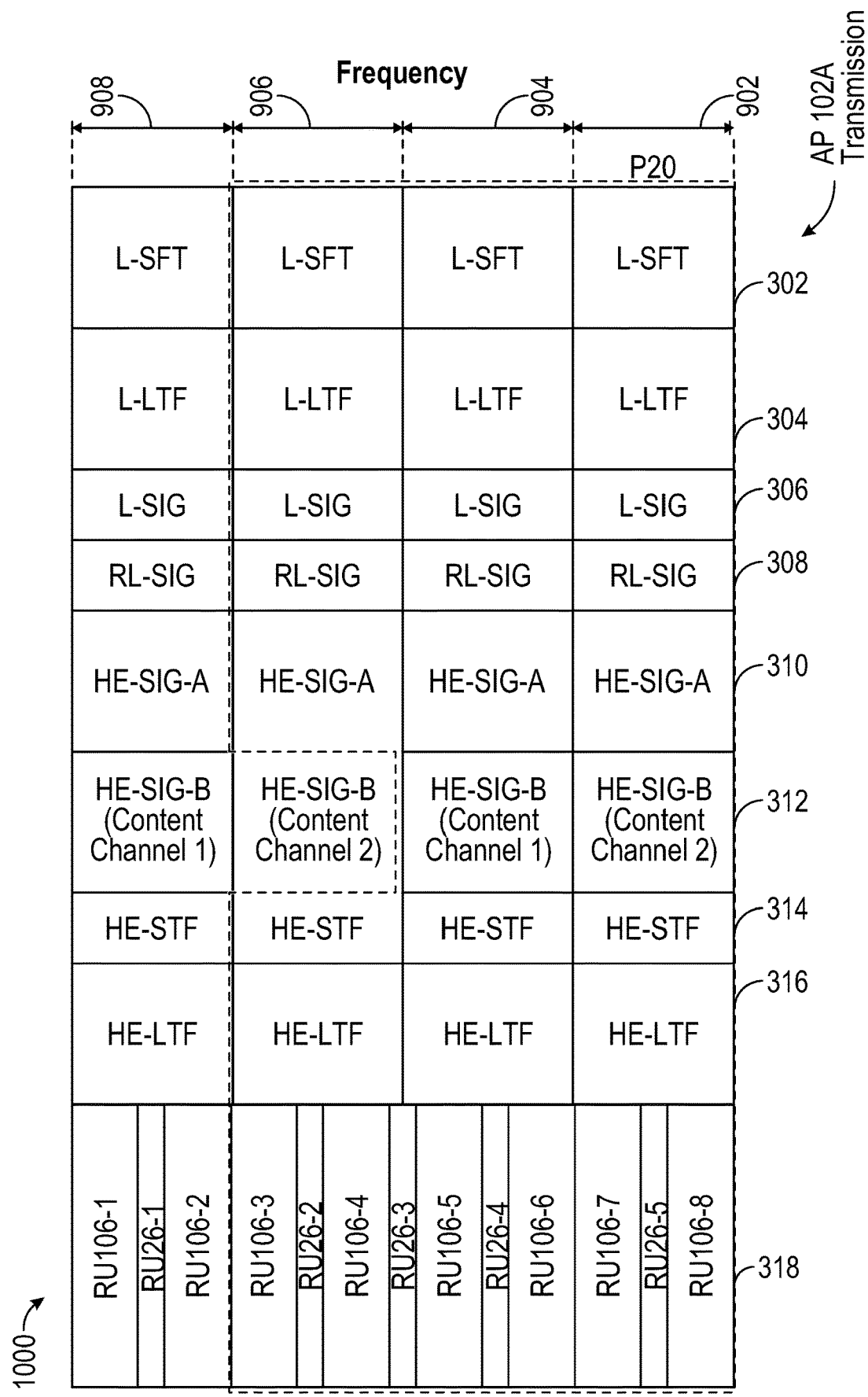
FIG. 10 illustrates an example HE MU data transmitted by a scheduling AP sharing its resources with an OBSS, according to one embodiment.

In some cases, the OBSS trigger frame 502 may not be received by one or more neighbor APs. For example, a neighbor AP (e.g., AP 102B) may not have detected the OBSS trigger frame 502, the neighbor AP may have failed to decode the OBSS trigger frame 502, etc. In these situations, the neighbor AP can fail to set a NAV for other 20 MHz/40 MHz devices operating on the secondary 40 MHz. This can cause the HE MU PPDU to have an irregular format and lead to higher collision rates. To address this, embodiments may modify the FIG. 10 depicts an example HE MU PPDU 1000 transmitted by AP 102A that can reduce collisions rates, according to one embodiment. In this embodiment, L-STF 302, L-LTF 304, L-SIG 306, RL-SIG 308, and HE-SIG-A 310 are sent on (the top) 3×20 MHz subchannels 902, 904, and 906, HE-SIG-B 312 is sent on the 2×20 MHz subchannels 902 and 904, and HE-STF 314, HE-LTF 316, and HE data 318 are sent on the 3×20 MHz subchannels 902, 904, and 906. Note that while FIG. 10 depicts L-SIG 306, RL-SIG 308, and HE-SIG-A 310 being sent on (the top) 3×20 MHz subchannels 902, 904, and 906, in other embodiments, the AP 102A can transmit on the 3×20 MHz subchannels 902, 904, and 906 from L-STF 302 through either L-SIG 306, RL-SIG 308, or HE-SIG-A 310, then transmit on the 2×20 MHz subchannels 902 and 904 through the HE-SIG-B 312, and then add partial bandwidth starting with the HE-STF 314. In this manner, the AP 102A can provide L-SIG protection to prevent devices on the secondary 40 MHz (e.g., subchannels 906 and 908) from operating on the partial bandwidth.

Figure 11:
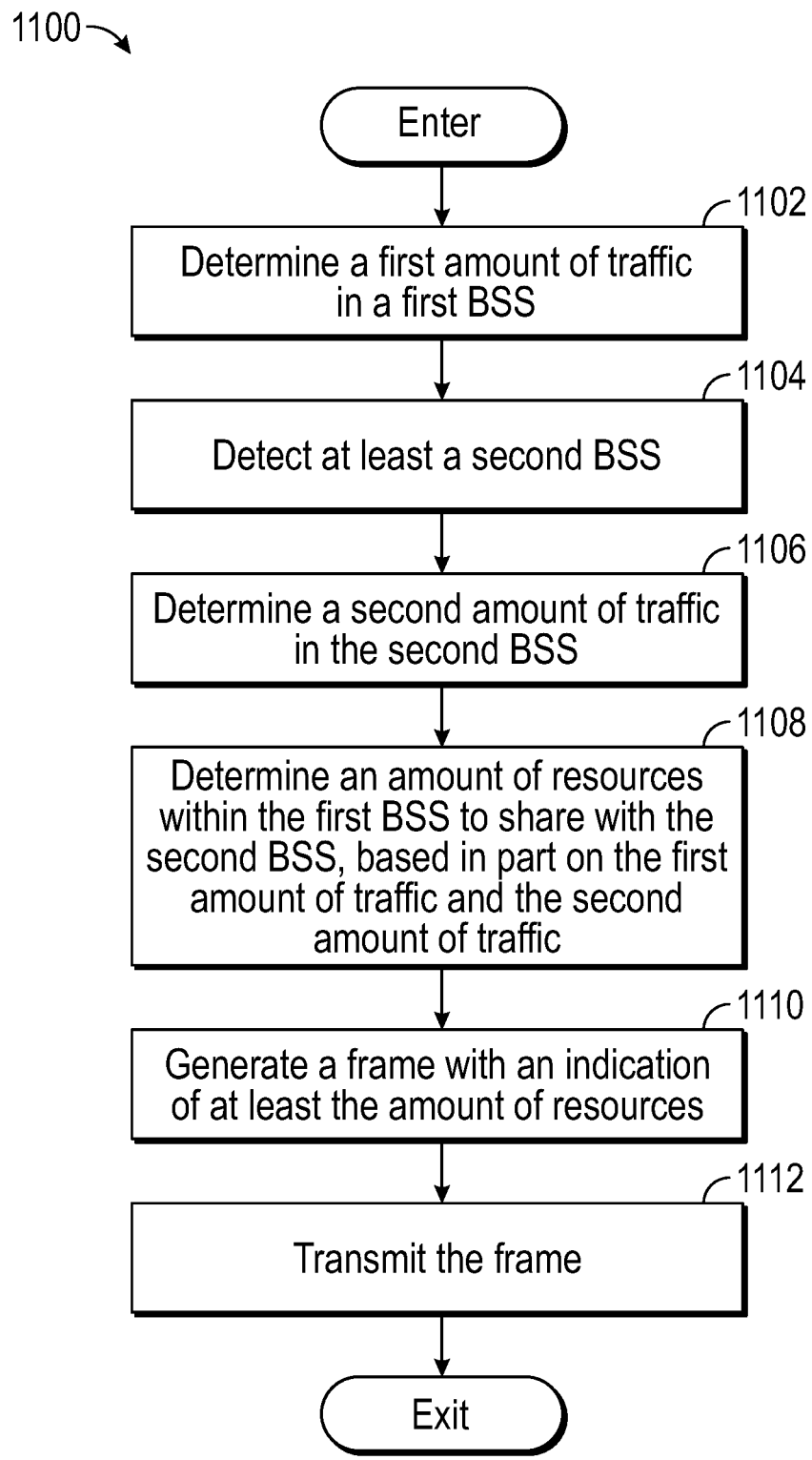
FIG. 11 is a flowchart of a method for triggering different BSSs to share resources for a coordinated MU transmission, according to one embodiment.

FIG. 11 is a flowchart of a method 1100 for triggering different BSSs (e.g., OBSSs) to share resources for a coordinated MU transmission, according to one embodiment. The method 1100 may be performed by a scheduling apparatus (e.g., AP 102, central controller 120, etc.).

In one embodiment, the scheduling apparatus may perform the method 1100 in cases where multiple BSSs that form an OBSS (or a part of an OBSS) are expected to share a medium. For example, the scheduling apparatus may determine that a first BSS and second BSS are assigned to the same channel (e.g., 80 MHz channel) with different primary subchannels (e.g., AP 102A assigned to primary subchannel 902 and AP 102B assigned to primary subchannel 908). In addition, the scheduling apparatus may have determined, based on prior signaling, that at least one of the OBSSs has an amount of traffic above a threshold amount of traffic to send in a next time window.

In one embodiment, the scheduling apparatus may be a central entity, such as the central controller 120. For example, the central entity can evaluate the traffic within each of the BSSs that form the OBSS, and determine, based on one or more parameters, whether one or more of the BSSs should dynamically share the medium.

In another embodiment, the scheduling apparatus may be an AP, such as AP 102A. For example, the AP in a first BSS can access statistics (and other parameters) related to the traffic in the other BSSs within a time frame, and determine, based on the statistics, whether one or more of the BSSs should dynamically share the medium.

As shown, method 1100 begins at block 1102, where the scheduling apparatus determines a first amount of traffic (or data) (available to be sent) in a first BSS (e.g., BSS 110A). For example, the first amount of traffic can include (scheduled) downlink traffic and/or (scheduled) uplink traffic. At block 1104, the scheduling apparatus detects at least a second BSS (e.g., BSS 110B). The second BSS, for example, may be an OBSS with respect to the first BSS.

At block 1106, the scheduling apparatus determines a second amount of traffic that is available to be sent in the second BSS. In one embodiment, the scheduling apparatus may determine the second amount of traffic based on prior information obtained from the second BSS regarding the amount of traffic in the second BSS. For example, the scheduling apparatus may have obtained signaling (over a wired medium and/or wireless medium) with parameter(s) indicating at least one of the second BSS's operating channel and bandwidth, distance (pathloss) and azimuth angles between the first BSS and the second BSS, second BSS's color, OBSS_PD threshold configured at the second BSS, second BSS's past traffic history and bandwidth usage, etc.

At block 1108, the scheduling apparatus determines an amount of resources (e.g., PPDU resources) within the first BSS to share with the second BSS, based at least in part on the first amount of traffic and the second amount of traffic. In some embodiments, the determination of the amount of resources may be based on an RU allocation strategy (e.g., RU vector) determined by the scheduling apparatus. For example, as noted, the scheduling apparatus can determine, based on the parameter(s) obtained from the BSS(s), an RU vector indicating at least one of: (1) the amount of resources (e.g., number of subcarriers, number of RUs, etc.) within the first BSS's transmission spectrum that can be shared by the second BSS; (2) the anchor (or starting) subcarrier within the first BSS's transmission spectrum where the second BSS can begin allocating RUs; and (3) the direction (from the anchor subcarrier) in which the second BSS's resource allocation (within the first BSS's transmission spectrum) can grow. In some embodiments, the scheduling apparatus can also determine (at block 1108) a transmission schedule to be used for a coordinated MU transmission from the first BSS and the second BSS, based on the parameter(s) of the first and second BSSs.

At block 1110, the scheduling apparatus generates a frame (e.g., OBSS trigger frame 502) that includes an indication of at least the amount of resources. In some embodiments, the frame can include an indication of the transmission schedule and the RU allocation strategy. At block 1112, the scheduling apparatus transmits the frame. In one embodiment, assuming the scheduling apparatus is a central entity (e.g., central controller 120), the scheduling apparatus can transmit the frame to both the first BSS and the second BSS. In another embodiment, assuming the scheduling apparatus is an AP in the first BSS (e.g., AP 102A), the scheduling apparatus can transmit the frame to the second BSS.

Figure 12:
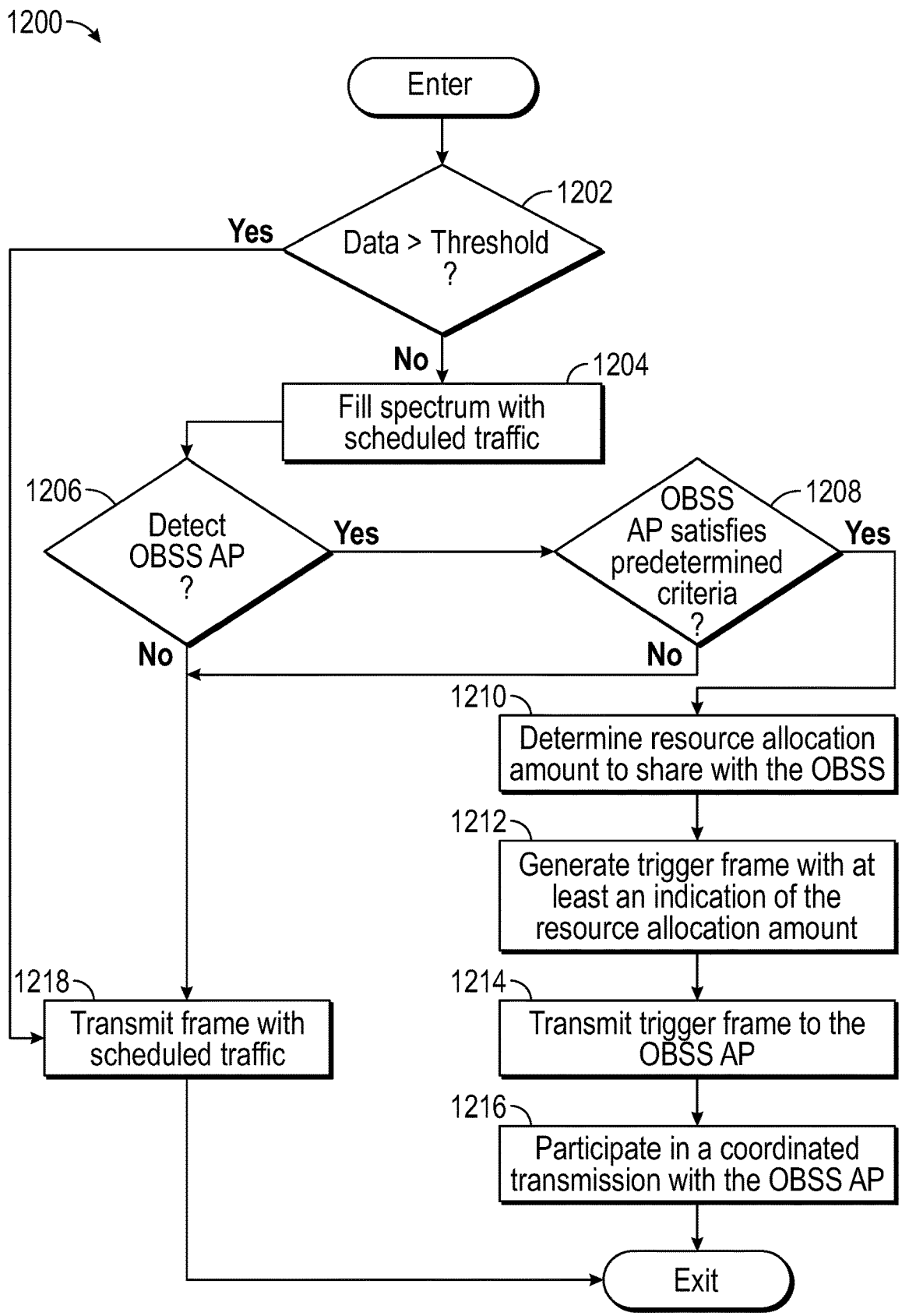
FIG. 12 is a flowchart of another method for triggering different BSSs to share resources for a coordinated MU transmission, according to one embodiment.

FIG. 12 is a flowchart of a method 1200 for triggering different BSSs (e.g., OBSSs) to share resources for a coordinated MU transmission, according to one embodiment. The method 1200 may be performed by a scheduling apparatus in a first BSS (e.g., AP 102A in BSS 110A). Note that while method 1200 assumes the scheduling apparatus is an AP in one of the BSSs, in other embodiments, the method 1200 can be performed by a central entity (e.g., central controller 120).

Method 1200 begins at block 1202, where the scheduling apparatus determines whether the transmission spectrum (or medium) in the first BSS is saturated. For example, the scheduling apparatus can determine whether the amount of traffic available to be sent (in a given time window) is at or above a threshold amount of traffic. In some cases, the scheduling apparatus can determine whether the percent duty cycle of scheduled traffic within the first BSS is above a threshold. In some cases, the scheduling apparatus can determine whether the amount of available bandwidth within the transmission spectrum (e.g., for additional traffic) is below a threshold.

If the transmission spectrum is saturated, the scheduling apparatus proceeds to transmit a frame with the scheduled traffic in the first BSS (e.g., without sharing resources with an OBSS) (block 1218). If the transmission spectrum is not saturated, the scheduling apparatus fills the spectrum with the available scheduled traffic in the first BSS (block 1204). At block 1206, the scheduling apparatus determines whether there is another AP (e.g., OBSS AP) in a second BSS (e.g., AP 102B in BSS 110B) in proximity to the first BSS. In some cases, for example, the scheduling apparatus can receive a frame from the second BSS and determine, based on the receive signal strength of the frame, whether the frame belongs to the first BSS or the second BSS. In some cases, the scheduling apparatus can determine that there is an OBSS AP based on an indication from the central controller 120 and/or based on prior signaling with the OBSS AP. If there is not an OBSS AP, the scheduling apparatus proceeds to block 1218.

On the other hand, if there is an OBSS AP, the scheduling apparatus determines whether the OBSS AP satisfies one or more predetermined criteria (block 1208). The predetermined criteria may be based on a PPDU length (e.g., transmission time) in the first BSS and/or amount of scheduled traffic in the second BSS. For example, in general, the scheduling apparatus may determine to share its transmission spectrum with another OBSS AP(s) when it (1) determines that it is able to elongate its transmission (e.g., increase the transmission time of the PPDU) while still accommodating its scheduled traffic in the first BSS and/or (2) determines, based on prior information or an estimation, that the OBSS AP(s) have enough scheduled traffic (e.g., above a threshold) to fill out the remaining spectrum in the first BSS.

In one embodiment, the scheduling apparatus may determine (at block 1208) (e.g., as part of the predetermined criteria) whether the amount of scheduled traffic in the second BSS is above a threshold amount of traffic. Additionally or alternatively, in one embodiment, the scheduling apparatus may determine (at block 1208) (e.g., as part of the predetermined criteria) whether elongating its PPDU to accommodate the scheduled traffic from the OBSS AP satisfies a threshold. For example, the scheduling apparatus may determine whether the estimated increase in PPDU length is less than a maximum PPDU length ("Max_PPDU_Len" configured for the scheduling apparatus). Additionally or alternatively, in one embodiment, the scheduling apparatus may determine (at block 1208) (e.g., as part of the predetermined criteria) whether the estimated increase in PPDU transmission time satisfies a threshold. For example, the scheduling apparatus may determine whether the estimated increase in PPDU transmission time is greater than a maximum PPDU transmission time increase threshold ("Max_PPDU_Tx_Time_Inc_Threshold" configured for the scheduling apparatus). If the OBSS AP does not satisfy the predetermined criteria, the method 1200 proceeds to block 1218.

If the OBSS AP does satisfy the predetermined criteria, the scheduling apparatus determines an amount of resources (within the transmission spectrum) to share with the OBSS AP (block 1210). As noted, the scheduling apparatus may determine, based on parameters regarding the traffic in the second BSS, at least one of an RU vector (that includes an indication of the amount of resources, an anchor subcarrier, and a direction in which to allocate RUs within the transmission spectrum) and a transmission schedule for a coordinated MU transmission by the scheduling apparatus and the OBSS AP.

In one particular embodiment, the amount of resources to share is determined based on the maximum number of subcarriers that can be filled by the OBSS AP (e.g., "max_obss_subcarriers") and the maximum number of subcarriers that can be shared with the OBSS AP by elongating the PPDU (e.g., increasing the transmission time) in the first BSS (e.g., "max_free_subcarriers"). For example, the scheduling apparatus can determine to share a minimum of "max_obss_subcarriers" and "max_free_subcarriers" with the OBSS AP.

At block 1212, the scheduling apparatus generates a trigger frame (e.g., OBSS trigger frame 502, OBSS trigger frame 804, etc.) that includes at least an indication of the amount of resources to be shared with the OBSS AP. In some embodiments, the trigger frame can include an RU vector and/or transmission schedule. At block 1214, the scheduling apparatus transmits the trigger frame to the OBSS AP.

At block 1216, the scheduling apparatus participates in a coordinated MU transmission with the OBSS AP. In one embodiment, for example, the scheduling apparatus and OBSS AP can transmit HE MU PPDUs in parallel (e.g., within the transmission spectrum of the scheduling apparatus) to one or more client STA (e.g., client STAs 104 A-D). In one embodiment, the scheduling apparatus and/or the OBSS AP can receive a coordinated (UL) MU transmission (e.g., HE TB PPDU(s)) from one or more client STAs, based on the constraints indicated in the trigger frame. The method 1200 then ends.

Note that the techniques described herein are not limited to a single OBSS scenario in which a first BSS decides to share its resources with a single OBSS. In other embodiments, the first BSS using the techniques presented herein can share its resources with multiple OBSSs. For example, in a case where a second AP and a third AP have sufficient pathloss between themselves, the first AP can trigger both the second AP and the third AP with the same reuse.

Figure 13:
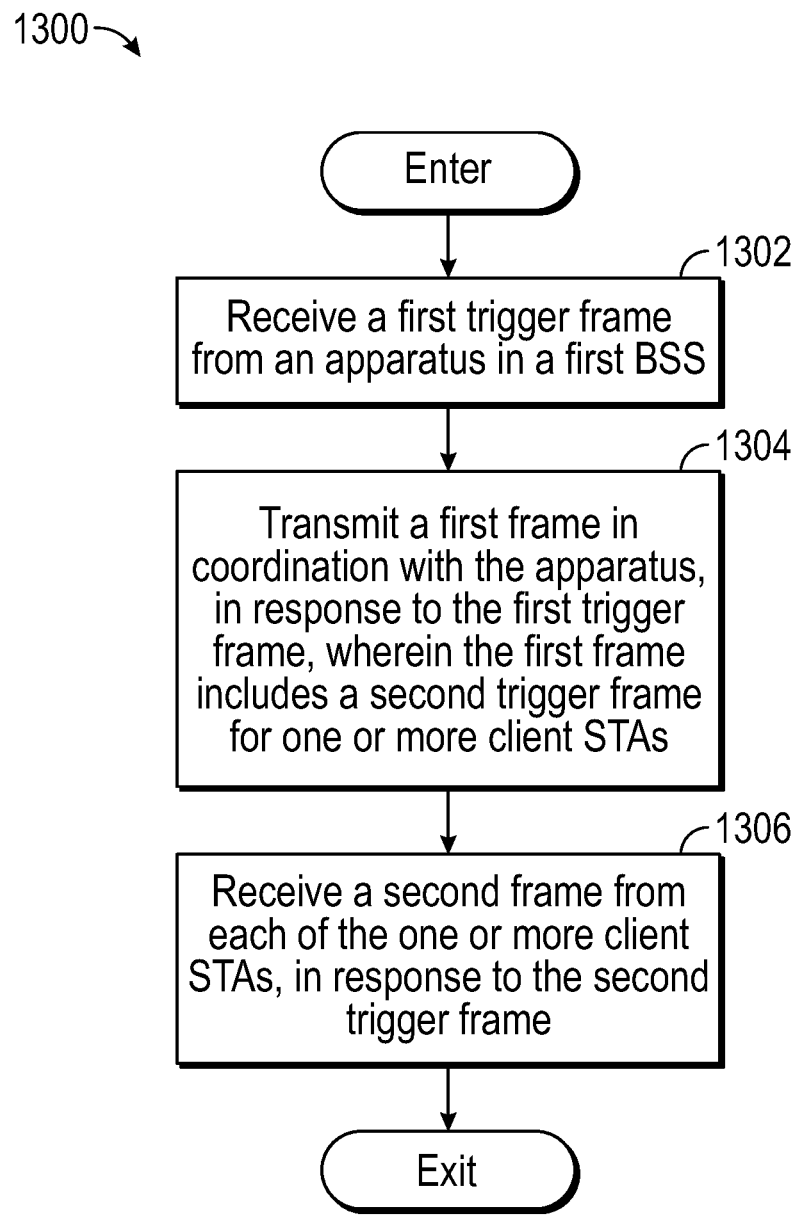
FIG. 13 is a flowchart of a method for participating in a coordinated transmission using shared resources in another BSS, according to one embodiment.

FIG. 13 is a flowchart of a method 1300 for participating in a coordinated transmission using shared resources in another BSS, according to one embodiment. The method 1300 may be performed by an apparatus in an OBSS (e.g., AP 102B in BSS 110B).

Method 1300 begins at block 1302, where the (first) apparatus receives a first trigger frame (e.g., OBSS trigger frame 502) from another (second) apparatus in a first BSS (e.g., AP 102A in BSS 110A). In one embodiment, the first trigger frame includes an indication of at least one of a transmission schedule and a RU vector to be used for a coordinated MU transmission from the apparatus and the other apparatus.

At block 1304, the apparatus transmits a first frame (e.g., PPDU) in coordination with the other apparatus, in response to the first trigger frame. For example, the apparatus can transmit a HE MU PPDU using the PPDU resources of the other apparatus. The first frame includes a second trigger frame for one or more client STAs (e.g., client STAs 104 C-D) associated with the apparatus. In one embodiment, the second trigger frame includes an allocation of RUs for the client STA(s) that is consistent with the RU vector received from the first trigger frame. At block 1306, the apparatus receives a third frame (e.g., HE TB PPDU) from each of the client STA(s), in response to the second trigger frame.

Figure 14A:
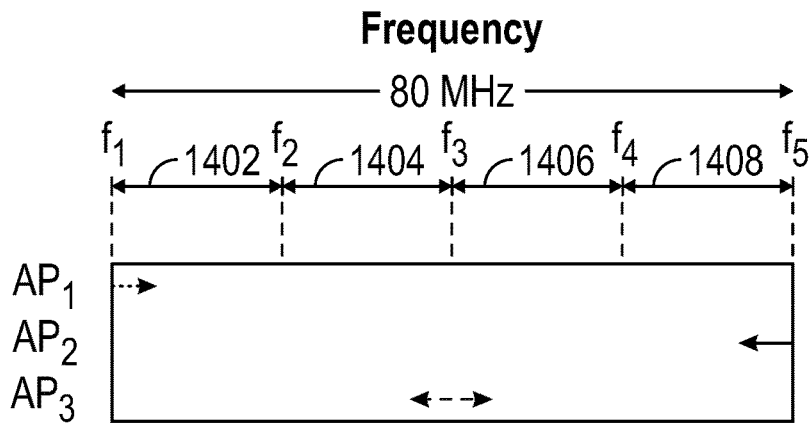
FIGS. 14A-14B illustrate example resource unit vector assignments for multiple OBSS scenarios, according to one embodiment.
Figure 14B:
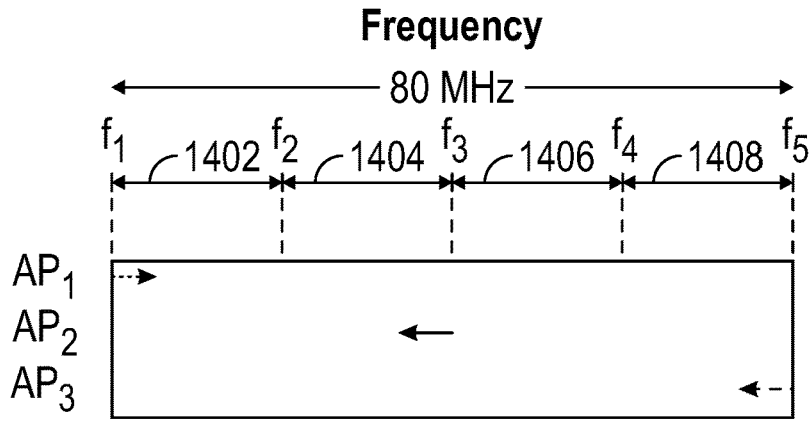

FIGS. 14A and 14B illustrate reference examples of RU vector assignments for multiple OBSSs, according to one embodiment. In FIGS. 14A and 14B, an 80 MHz channel includes four 20 MHz subchannels 1402, 1404, 1406, and 1408, where $f_1 < f_2 < f_3 < f_4 < f_5$. In these examples, it is assumed that there are three OBSS APs ($AP_1$, $AP_2$, and $AP_3$) operating on the same 80 MHz channel with overlapping subchannels. FIG. 14A, for example, assumes that $AP_1$ is initially operating on the entire bandwidth ($f_1$ to $f_5$), $AP_2$ is initially operating on 40 MHz ($f_3$ to $f_5$), and $AP_3$ is initially operating on 40 MHz ($f_2$ to $f_4$). In another example, FIG. 14B assumes $AP_1$ is initially operating on the entire bandwidth ($f_1$ to $f_5$), $AP_2$ is initially operating on 40 MHz ($f_1$ to $f_3$), and $AP_3$ is initially operating on 40 MHz ($f_3$ to $f_5$).

In each of these scenarios, the scheduling apparatus can determine (based on parameters associated with the traffic within the OBSSs) an $RUvector_i(f_{start}$, direction) for each $AP_i$, such that the OBSS APs are able to share the same transmission spectrum (e.g., for a coordinated transmission). In the reference example shown in FIG. 14A, for example, the scheduling apparatus allocates the RU vectors for $AP_1$ and $AP_2$ at the two ends of the spectrum with $RUvector_1(f_1, \text{"1"})$ and $RUvector_2(f_5, \text{"2"})$, where "1" indicates a positive frequency direction, and "2" indicates a negative frequency direction. The scheduling apparatus then allocates the RU vector for $AP_3$ in the middle of spectrum with $RUvector_3(f_3, \text{"3"})$, where "3" indicates that the resource allocation can grow in both positive and negative frequency directions. In the reference example shown in FIG. 14B, the scheduling apparatus allocates the RU vectors for $AP_1$ and $AP_3$ at the two ends of the spectrum with $RUvector_1(f_1, \text{"1"})$ and $RUvector_3(f_5, \text{"2"})$, and allocates the RU vector for $AP_2$ with $RUvector_2(f_3, \text{"2"})$. Each AP may independently allocate RUs for a (downlink or uplink) coordinated transmission in accordance with the RU vector for the AP.

Note that the RU vector assignments depicted in FIGS. 14A and 14B are provided merely as reference examples. In general, the RU vector assignments may be based on the given OBSS scenario and other parameters regarding the traffic profile in each of the OBSS. Additionally, note that the values "1," "2," and "3" in FIGS. 14A and 14B are provided merely as reference examples, and that other values can be used to indicate the resource allocation direction. Further note that in FIGS. 14A and 14B, the scheduling apparatus can be $AP_1$ or a central controller 120.

Figure 15:
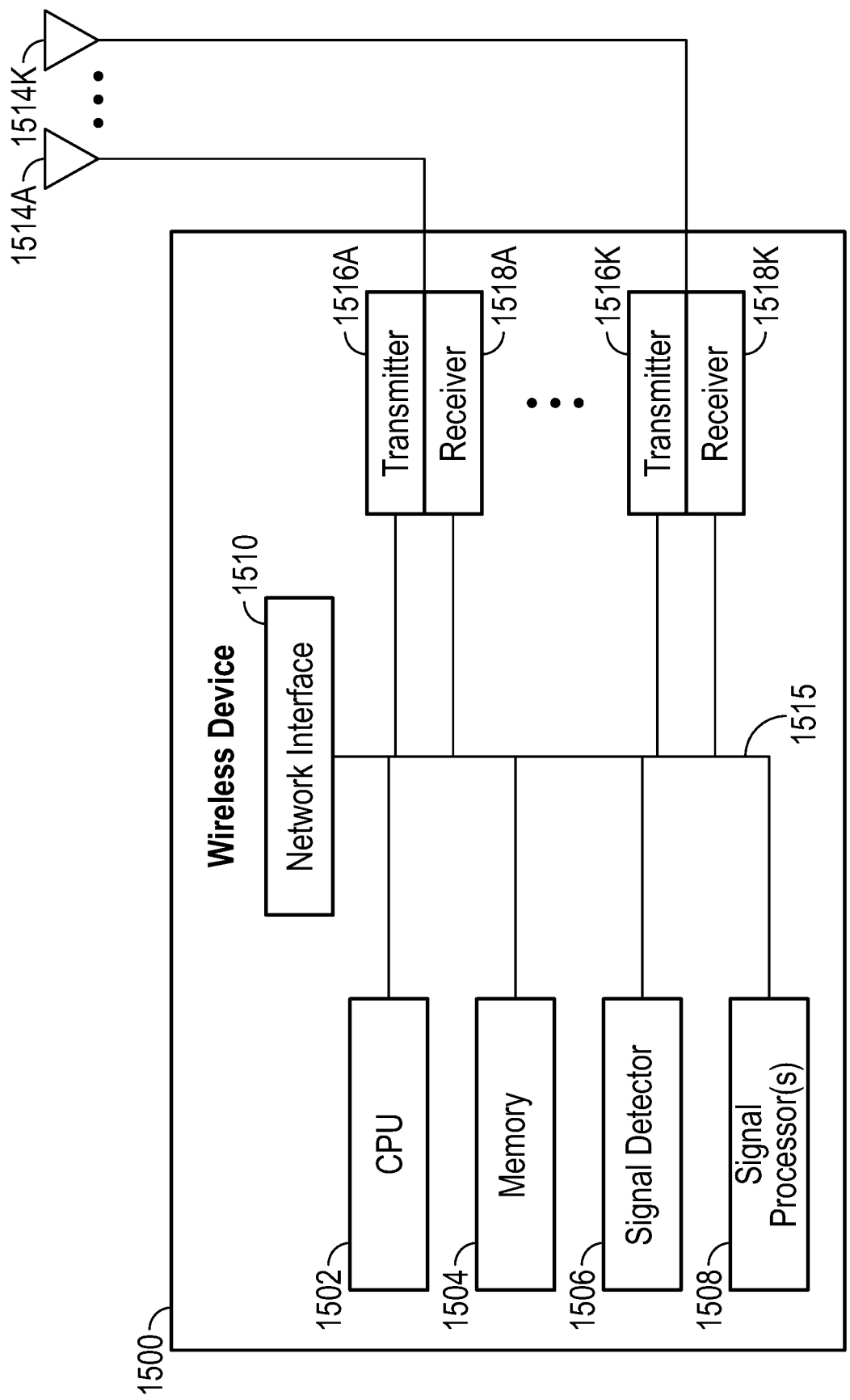
FIG. 15 illustrates an example wireless device, according to one embodiment.

FIG. 15 illustrates various components that may be utilized in a wireless device 1500 that may be employed within the wireless network 100. The wireless device 1500 is an example of a device that can implement the various techniques described herein. For example, the wireless device 1500 can perform method 1100, method 1200, and method 1300. The wireless device 1500 can be an AP (e.g., AP 102), a central controller 120, or a client STA (e.g., client STA 104).

As shown, the wireless device 1500 includes, without limitation, a central processing unit (CPU) 1502, a network interface 1510, a memory 1504, a signal detector 1506, and signal processor(s) 1508, each connected to a bus 1515. The wireless device 1500 also includes transmitters 1516 A-K and receivers 1518 A-K to allow transmission and reception of data between the wireless device 1500 and other device(s). Each transmitter 1516 and receiver 1518 can be combined into a transceiver. Multiple antennas 1514 A-K are electrically coupled to the transmitters 1516 A-K and receivers 1518 A-K. The wireless device 1500 is configured to perform MIMO (e.g., MU-MIMO, single-user (SU)-MIMO) and beamforming techniques, using the multiple antennas 1514 A-K.

The CPU 1502 generally controls operation of the wireless device 1500. For example, the CPU 1502 retrieves and executes programming instructions stored in the memory 1504 as well as stores and retrieves application data residing in the memory 1504. The memory 1504, which may include both read-only memory (ROM) and random access memory (RAM), provides instructions and data to the CPU 1502. A portion of the memory 1504 also may include non-volatile random access memory (NVRAM). The instructions in the memory 1504 are executable to implement the techniques described herein. Note CPU 1502 is included to be representative of a single CPU, multiple CPUs, a single CPU having multiple processing cores, and the like.

The wireless device 1500 can use the signal detector 1506 to detect and quantify the level of signals received by the receivers 1518 A-K. The signal detector 1506 may detect such signals as total energy, energy per subcarrier per symbol, power spectral density and other signals. The wireless device 1500 can use the signal processor(s) 1508 (e.g., digital signal processor(s) (DSP(s)) in processing signals. For example, the signal processor(s) 1508 can perform transmit signal processing of signals to be transmitted via the plurality of antennas 1514 A-K, e.g., for MU-MIMO and OFDMA transmissions, and perform receive processing of signals that are received by the plurality of antennas 1514 A-K.

The various components of the wireless device 1500 may be coupled together by a bus system 1515, which may include a power bus, a control signal bus, and a status signal bus in addition to a data bus. The network interface 1510 can be used as a wired network interface, e.g., to connect to another network via a wired medium.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of wireless communication by an apparatus, comprising:
    determining a first amount of data available to send in a first basic service set (BSS);
    determining a second amount of data available to send in a second BSS, wherein the first BSS and the second BSS form an overlapping BSS;
    determining a plan for allocating resources within a transmission spectrum of the first BSS, based at least in part on the first amount of data and the second amount of data, wherein the plan indicates (i) an available amount of resources within the transmission spectrum of the first BSS to share with the second BSS for a coordinated transmission from the first BSS and the second BSS, (ii) an anchor frequency location within the transmission spectrum of the first BSS, and (iii) a direction with respect to the anchor frequency location in which a resource allocation can grow;
    generating a first frame comprising the plan; and
    transmitting the first frame to the second BSS.

2. The method of claim 1, further comprising determining a transmission schedule for the coordinated transmission, the transmission schedule indicating at least one of a starting time for the coordinated transmission and a length of the coordinated transmission, wherein the first frame comprises the transmission schedule.

3. The method of claim 1, further comprising determining that one or more predetermined conditions are satisfied prior to generating and transmitting the first frame, wherein the one or more predetermined conditions comprises at least one of:
a determination that the second amount of data is above a threshold amount of data; and
a determination that a length of a second frame carried in a Physical Layer Convergence Protocol (PLCP) Protocol Data Unit (PPDU) transmitted from the first BSS as a part of the coordinated transmission is below a threshold length.

4. The method of claim 1, further comprising obtaining one or more parameters regarding traffic in the second BSS, wherein:
the available amount of resources are determined further based on the one or more parameters; and
the one or more parameters comprises at least one of: (i) a prior bandwidth usage in the second BSS; (ii) an operating channel of the second BSS; (iii) a distance of an access point (AP) of the second BSS from the first BSS; (iv) an angle of the AP of the second BSS relative to the first BSS; (v) a color of the second BSS; and (vi) a Physical Layer Convergence Protocol (PLCP) Protocol Data Unit (PPDU) detection threshold configured for the second BSS.

5. The method of claim 1, further comprising transmitting a first Physical Layer Convergence Protocol (PLCP) Protocol Data Unit (PPDU) as a part of the coordinated transmission after transmitting the first frame, wherein:
the first PPDU comprises the first amount of data within a first portion of the transmission spectrum; and
the first PPDU is transmitted in parallel with a second PPDU from the second BSS, the second PPDU comprising at least the second amount of data within a second portion of the transmission spectrum.

6. The method of claim 5, wherein the first PPDU further comprises a second frame that triggers at least one or more devices within the first BSS to participate in a coordinated transmission.

7. The method of claim 1, wherein:
the first BSS and the second BSS are assigned to a same operating channel;
the first BSS is assigned to a first subchannel within the same operating channel; and
the second BSS is assigned to a second subchannel within the same operating channel.

8. The method of claim 7, wherein the first subchannel and the second subchannel are non-overlapping subchannels.

9. The method of claim 7, wherein the first subchannel overlaps with the second subchannel.

10. The method of claim 1, wherein determining the available amount of resources based at least in part on the first amount of data and the second amount of data comprises determining a product of transmission time and a measure of bandwidth needed to convey the first amount of data and the second amount of data.

11. An apparatus, comprising:
a processor;
a memory containing a program that, when executed by the processor, performs an operation comprising:
determining a first amount of data available to send in a first basic service set (BSS);
determining a second amount of data available to send in a second BSS, wherein the first BSS and the second BSS form an overlapping BSS;
determining a plan for allocating resources within a transmission spectrum of the first BSS, based at least in part on the first amount of data and the second amount of data, wherein the plan indicates (i) an available amount of resources within the transmission spectrum of the first BSS to share with the second BSS for a coordinated transmission from the first BSS and the second BSS, (ii) an anchor frequency location within the transmission spectrum of the first BSS, and (iii) a direction with respect to the anchor frequency location in which a resource allocation can grow; and
generating a first frame comprising the plan; and
a transmitter configured to transmit the first frame to the second BSS.

12. The apparatus of claim 11, the operation further comprising determining a transmission schedule for the coordinated transmission, the transmission schedule indicating at least one of a starting time for the coordinated transmission and a length of the coordinated transmission, wherein the first frame comprises the transmission schedule.

13. The apparatus of claim 11, wherein:
the transmitter is further configured to transmit a first Physical Layer Convergence Protocol (PLCP) Protocol Data Unit (PPDU) as a part of the coordinated transmission after transmitting the first frame;
the first PPDU comprises the first amount of data within a first portion of the transmission spectrum; and
the first PPDU is transmitted in parallel with a second PPDU from the second BSS, the second PPDU comprising at least the second amount of data within a second portion of the transmission spectrum.

14. The apparatus of claim 13, wherein the first PPDU further comprises a second frame that triggers at least one or more devices within the first BSS to participate in a coordinated transmission.

15. The apparatus of claim 11, the operation further comprising determining that one or more predetermined conditions are satisfied prior to generation and transmission of the first frame, wherein the one or more predetermined conditions comprises at least one of:
a determination that the second amount of data is above a threshold amount of data; and
a determination that a length of a second frame carried in a Physical Layer Convergence Protocol (PLCP) Protocol Data Unit (PPDU) transmitted from the first BSS as a part of the coordinated transmission is below a threshold length.

16. The apparatus of claim 11, the operation further comprising obtaining one or more parameters regarding traffic in the second BSS, wherein:
the available amount of resources are determined further based on the one or more parameters; and
the one or more parameters comprises at least one of: (i) a prior bandwidth usage in the second BSS; (ii) an operating channel of the second BSS; (iii) a distance of an access point (AP) of the second BSS from the first BSS; (iv) an angle of the AP of the second BSS relative to the first BSS; (v) a color of the second BSS; and (vi) a Physical Layer Convergence Protocol (PLCP) Protocol Data Unit (PPDU) detection threshold configured for the second BSS.

17. The apparatus of claim 11, wherein:
the first BSS and the second BSS are assigned to a same operating channel;
the first BSS is assigned to a first subchannel within the same operating channel; and
the second BSS is assigned to a second subchannel within the same operating channel.

18. The apparatus of claim 17, wherein the first subchannel and the second subchannel are non-overlapping subchannels.

19. A method of wireless communication by an apparatus, comprising:
    receiving a first frame comprising a plan for allocating resources within a transmission spectrum of a first basic service set (BSS), wherein the plan indicates (i) an available amount of resources within the transmission spectrum of the first BSS that can be shared with the apparatus for a coordinated transmission, wherein the apparatus is in a second BSS, (ii) an anchor frequency location within the transmission spectrum of the first BSS, and (iii) a direction with respect to the anchor frequency location in which a resource allocation can grow; and
    transmitting, in response to the first frame, a Physical Layer Convergence Protocol (PLCP) Protocol Data Unit (PPDU) as a part of the coordinated transmission using the available amount of resources within the transmission spectrum of the first BSS.

20. The method of claim 19, further comprising allocating resources for the PPDU within the transmission spectrum of the first BSS based on the plan.

* * * * *

UNITED STATES PATENT AND TRADEMARK OFFICE
CERTIFICATE OF CORRECTION

PATENT NO. : 11,122,594 B2
APPLICATION NO. : 16/512251
DATED : September 14, 2021
INVENTOR(S) : Gautam D. Bhanage et al.

It is certified that error appears in the above-identified patent and that said Letters Patent is hereby corrected as shown below:

On the Title Page

On the page 2, in Column 1, under "Other Publications", Line 3, delete "2018" and insert -- 2018 | --.

In the Specification

In Column 5, Line 1, delete "MDPU" and insert -- MPDU --.

In Column 5, Line 5, delete "etc.)." and insert -- etc.) --.

In Column 11, Lines 19-38, delete "FIG. 10 depicts an example HE MU PPDU 1000 transmitted by AP 102A that can reduce collisions rates, according to one embodiment. In this embodiment, L-STF 302, L-LTF 304, L-SIG 306, RL-SIG 308, and HE-SIG-A 310 are sent on (the top) 3×20 MHz subchannels 902, 904, and 906, HE-SIG-B 312 is sent on the 2×20 MHz subchannels 902 and 904, and HE-STF 314, HE-LTF 316, and HE data 318 are sent on the 3×20 MHz subchannels 902, 904, and 906. Note that while FIG. 10 depicts L-SIG 306, RL-SIG 308, and HE-SIG-A 310 being sent on (the top) 3×20 MHz subchannels 902, 904, and 906, in other embodiments, the AP 102A can transmit on the 3×20 MHz subchannels 902, 904, and 906 from L-STF 302 through either L-SIG 306, RL-SIG 308, or HE-SIG-A 310, then transmit on the 2×20 MHz subchannels 902 and 904 through the HE-SIG-B 312, and then add partial bandwidth starting with the HE-STF 314. In this manner, the AP 102A can provide L-SIG protection to prevent devices on the secondary 40 MHz (e.g., subchannels 906 and 908) from operating on the partial bandwidth." and insert the same on Column 11, Line 20 as a new paragraph.

Signed and Sealed this
Seventh Day of March, 2023

Katherine Kelly Vidal
*Director of the United States Patent and Trademark Office*